(12) United States Patent
Takatori

(10) Patent No.: US 8,434,102 B2
(45) Date of Patent: Apr. 30, 2013

(54) TELEVISION RECEIVER AND DIGITAL BROADCAST SYSTEM

(75) Inventor: Masahiro Takatori, Osaka (JP)

(73) Assignee: Panasonic Corporation, Osaka (JP)

( * ) Notice: Subject to any disclaimer, the term of this patent is extended or adjusted under 35 U.S.C. 154(b) by 1634 days.

(21) Appl. No.: 10/587,466

(22) PCT Filed: Jan. 26, 2005

(86) PCT No.: PCT/JP2005/001440
§ 371 (c)(1),
(2), (4) Date: Jul. 25, 2006

(87) PCT Pub. No.: WO2005/071964
PCT Pub. Date: Aug. 4, 2005

(65) Prior Publication Data
US 2007/0186237 A1    Aug. 9, 2007

(30) Foreign Application Priority Data
Jan. 27, 2004 (JP) ................................ 2004-017882

(51) Int. Cl.
*G06Q 30/00*    (2012.01)
*G05B 19/418*    (2006.01)

(52) U.S. Cl.
USPC ............................. 725/32; 713/182; 705/14.1

(58) Field of Classification Search .................. 713/200; 725/32
See application file for complete search history.

(56) References Cited

U.S. PATENT DOCUMENTS

| | | | |
|---|---|---|---|
| 6,539,548 B1 * | 3/2003 | Hendricks et al. | 725/109 |
| 7,844,489 B2 * | 11/2010 | Landesmann | 705/14.1 |
| 2001/0037461 A1 | 11/2001 | Conrath | |
| 2002/0124182 A1 * | 9/2002 | Bacso et al. | 713/200 |
| 2002/0129362 A1 * | 9/2002 | Chang et al. | 725/32 |
| 2003/0208758 A1 * | 11/2003 | Schein et al. | 725/42 |
| 2004/0261126 A1 * | 12/2004 | Addington et al. | 725/135 |
| 2005/0110909 A1 * | 5/2005 | Staunton et al. | 348/734 |

FOREIGN PATENT DOCUMENTS

| | | |
|---|---|---|
| EP | 0 719 045 A2 | 6/1996 |
| EP | 0891084 A2 | 1/1999 |
| JP | 2001-313920 A | 11/2001 |
| JP | 2001-320341 A | 11/2001 |
| JP | 2002-169923 A | 6/2002 |

(Continued)

OTHER PUBLICATIONS

Microsoft to Help Speed Deployment of Interactive TV Through Alliances With Professional Services Leaders. PR Newswire. Monday, Jun. 11, 2001.*

(Continued)

*Primary Examiner* — Victoria Vanderhorst
(74) *Attorney, Agent, or Firm* — RatnerPrestia

(57) ABSTRACT

Broadcast points in a broadcaster's sole region are turned into package information by processing the contents transmitted from a broadcaster, and the package information is stored in the receiver common information region of a television broadcast receiver, and thereby, it becomes possible even for a communication browser that is an application of the television broadcast receiver to refer to and use the information of broadcast points. It is possible by using a communication browser to receive a service provided in a home page of a company other than the broadcasting company.

18 Claims, 18 Drawing Sheets

FOREIGN PATENT DOCUMENTS

| | | |
|---|---|---|
| JP | 2004-145867 A | 5/2004 |
| JP | 2004-164287 A | 6/2004 |
| JP | 2004-252898 A | 9/2004 |
| JP | 2005-517338 | 8/2010 |
| WO | WO 95/01060 | 1/1995 |
| WO | WO 02/17620 A2 | 2/2002 |
| WO | WO 02/073967 A2 | 9/2002 |

OTHER PUBLICATIONS

European Search Report for application No. EP 05 70 4338 dated Feb. 9, 2007.

International Search Report for application No. PCT/JP2005/001440 dated Jun. 7, 2005.

* cited by examiner

TELEVISION RECEIVER AND DIGITAL BROADCAST SYSTEM

TECHNICAL FIELD

The present invention relates to an apparatus for receiving a digital television broadcast such as a television receiver, set-top box, personal computer, and portable telephone, and a digital broadcasting system.

BACKGROUND ART

Recently, a television broadcast is increasingly digitized, and a digital television broadcast receiver provided with data broadcast receiving function and mutually-directional function (hereinafter referred to as television receiver) is widely employed. As the data broadcast, various information broadcasts and services are available, and software download or the like is one of such data broadcasts. Also, as a combined terminal for broadcast and communication, a television receiver or a personal computer is on the market, which comprises a communication browser for displaying a home page on Internet in addition to a broadcast browser for displaying a data broadcast and can be connected to an information server via a communication network in such manner as to enable communication. A variety of such communication networks are available, and a cable network is one of them.

A broadcasting station broadcasts contents for counting points corresponding to the program viewing time of users (hereinafter referred to as broadcast points) and also provides the user of a television receiver with a broadcast points accumulating service. There are a variety of such contents, and a certified software program is one of them. The broadcasting station collects the broadcast points accumulated in the television receiver by using the mutually-directional function of the television receiver and also prepares a service such as exchange for premiums. Also, the broadcasting station collects and utilizes information such as program viewing records together with the broadcast points. About services offered by a broadcasting station to the user of a television receiver, there is a disclosure in Japanese Laid-Open Patent 2001-320341. Also, the accumulation of broadcast points such as accumulating the points obtained for example in a game or quiz in other service has been already done in a digital television broadcast. In Japan, such services are offered in conformity to the rules specified in ARIB TR-B15 Vol. 1, Chapter 3, 8.2 "Application of NVRAM used commonly in MM services."

DISCLOSURE OF THE INVENTION

A television receiver comprising a broadcaster's inherent information memory unit having a first sole region for storing inherent information of a broadcaster; a software program receiver unit which receives a software program for obtaining package information by using the inherent information; and a control unit which executes control for enabling the software program of the television receiver to use the inherent information of the broadcaster by using the software program for obtaining package information.

A digital broadcasting system comprising a broadcasting station device which digitally broadcasts a software program for obtaining package information that can be handled as common information by using inherent information; a television receiver which accumulates inherent information in a first sole region and receives a software program for obtaining package information by using the inherent information, obtaining package information that can be handled as common information by using the inherent information, and transmits the information to an information server connected in such manner as to enable communication; and an information server which receives package information and extracts points out of the inherent information, and provides the user of the television receiver with services corresponding to the points.

A digital broadcasting system comprising a first information server which digitally broadcasts inherent information and a software program for obtaining package information that can be handled as common information by using the inherent information; a television receiver which receives the inherent information and the software program for obtaining package information by using the inherent information, accumulates the inherent information in a first sole region and accumulates the software program in a second sole region, obtaining package information that can be handled as common information by using the inherent information, and transmits the information to a second information server connected in such manner as to enable communication; and a second information server which receives the package information and extracts confidential access software ID out of the inherent information.

DETAILED DESCRIPTION OF THE PREFERRED EMBODIMENTS

In a conventional configuration described above, the information of broadcast points and program viewing records is stored in the broadcaster's sole region of NVRAM (non-volatile memory) mentioned in ARIB TR-B15, Vol. 1, Chap. 3, 8.2 "Application of NVRAM commonly used for MM services." Various compositions are available for such broadcaster's sole region, and in short, it is a region exclusively usable for the broadcaster. The rules specified in ARIB TR-B15 Vol. 1, Chap. 3, 8.2 "Application of NVRAM commonly used for MM services" signify that the information stored in the broadcaster's sole region is accessible only to the contents originally specified by the broadcaster and not accessible from the contents of other companies. Accordingly, there arises such a problem that other companies are unable to provide the user of the television receiver with a service of using broadcast points accumulated in the receiver. As the broadcasting company, various companies are included, and a cable company is one of them.

Also, contents gaining access to the broadcaster's sole region are broadcast in relation to the commands in data broadcast signals transmitted from the broadcaster. The contents gaining access to the broadcaster's sole region are effective only in data broadcast processing at the television receiver, which are therefore accessible only when data broadcast is received and displayed. That is, at the combined terminal for broadcast and communication, it is unable to refer to the broadcast points from a communication browser that is an application of the television receiver. Accordingly, there arises a problem such that the television receiver is unable to provide a function of using broadcast points for receiving services offered by a company other than the broadcaster. The function that cannot be provided is, for example, a function of using broadcast points by gaining access to a home page on Internet operated by a company other than the broadcaster such as a function of exchanging broadcast points for credit card points (hereinafter referred to as card points).

The object of the present invention is to provide a television receiver and a digital broadcasting system which may solve the above conventional problems.

The preferred embodiments of the present invention will be described in the following with reference to the drawings.

Preferred Embodiment 1

Figure 1:
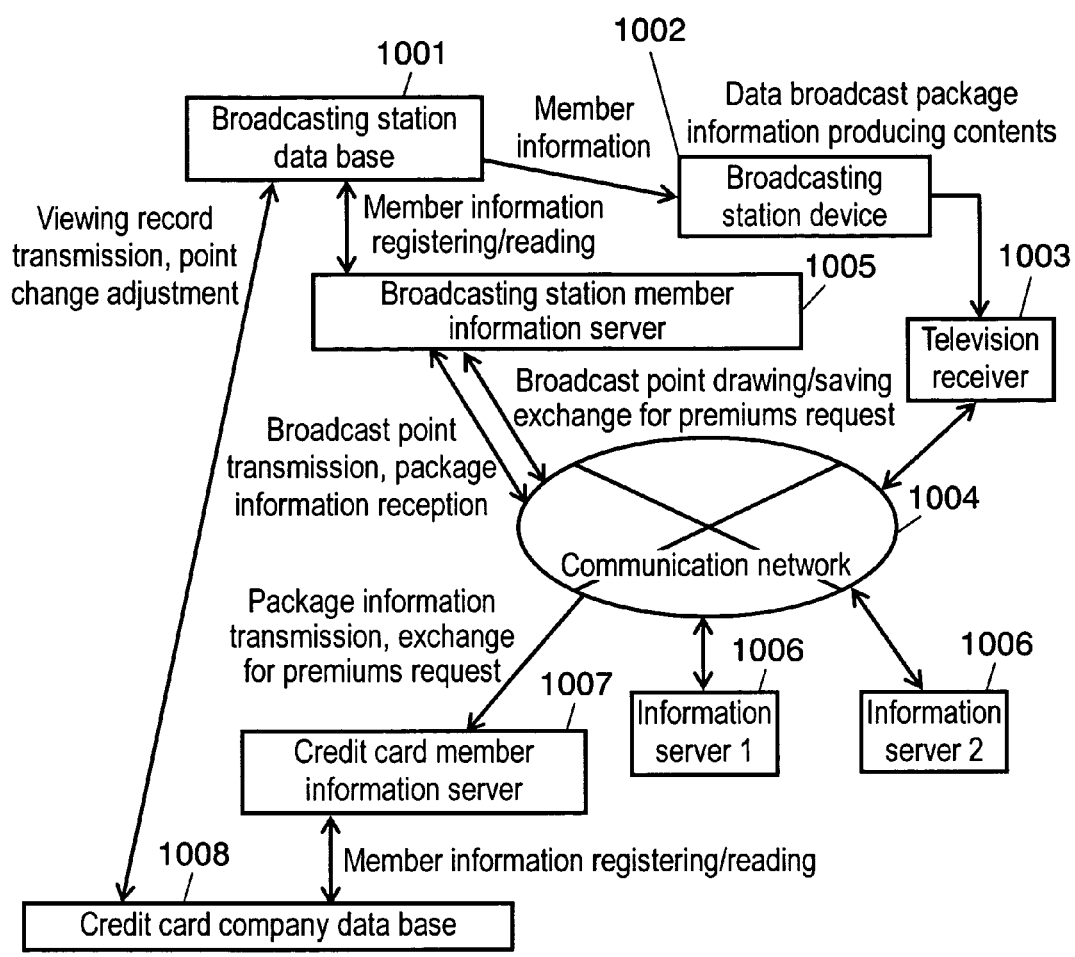
FIG. 1 is a structural diagram of a digital broadcasting system in one preferred embodiment of the present invention.

The first embodiment is described with reference to the drawings. FIG. 1 shows a configuration of a digital broadcasting system in the first embodiment of the present invention. The system shown in FIG. 1 comprises broadcasting station data base 1001, broadcasting station device 1002, television receiver 1003, broadcasting station member information server 1005, multiple information server 1006, credit card member information server 1007, credit company data base 1008, and communication network 1004. Out of these, television receiver 1003, broadcasting station member information server 1005, information server 1006, and credit card member information server 1007 are connected in such manner as to enable communication with each other via communication network 1004. Also, broadcasting station data base 1001 and broadcasting device 1002, broadcasting station data base 1001 and broadcasting station member information server 1005, credit company data base 1008 and credit card member information server 1007, and broadcasting station data base 1001 and credit company data base 1008 are respectively connected to each other by exclusive lines at all times. Also, television receiver 1003 receives the digital television broadcast transmitted from broadcasting station device 1002. In FIG. 1, only one television receiver 1003 is shown, but the system shown in FIG. 1 actually includes a plurality of television receivers 1003.

Information server 1006 is a server for accumulating home page information. As described above, television receiver 1003 is connected to information server 1006 in such manner as to enable communication with each other via communication network 1004. Television receiver 1003 gains access to information server 1006 via communication network 1004 to obtain home page information from information server 1006. Television receiver 1003 displays the home page information obtained from information server 1006 by using a communication browser and superposes it on the television picture or displays it on the television screen together with the television picture.

Broadcasting station member information server 1005 is a server managed by the broadcaster. Broadcasting station member information server 1005 supports various processes for the user of television receiver 1003 in using a variety of services offered by the broadcaster. For example, processes such as registration of members, getting or storing member's broadcast points, exchanging member's broadcast points for premiums, changing member's broadcast points into package information described later, and transmitting and receiving package information can be mentioned.

Broadcasting station data base 1001 is a data base managed by the broadcaster. When a user of television receiver 1003 becomes a member, the user is registered as a member through the process executed by broadcasting station member information server 1005. Broadcasting station data base 1001 builds up a data base for accumulating information about the members such as member's broadcast points.

Broadcasting station device 1002 is a device managed by the broadcaster. Broadcasting station device 1002 transmits television signals to television receiver 1003. Also, the broadcaster changes the prepared package information producing contents described later into a data broadcast that can be used in television receiver 1003. The contents are aggregation of data including software program. Thus, the broadcaster transmits the obtained package information producing contents to broadcasting device 1002 connected via an exclusive line. Broadcasting station device 1002 receives the package information producing contents prepared by the broadcaster via an exclusive line, and changes them into a data broadcast that can be used in television receiver 1003. Broadcasting station device 1002 transmits television signals including package information producing contents to television receiver 1003. The exclusive line mentioned above is not shown.

Credit card member information server 1007 is a server managed by the credit card company. Credit card member information server 1007 is a server of home page, and also supports various processes for the user of television receiver 1003 in using a variety of serves offered by the credit card company. For example, processes such as getting or storing member's card points, exchanging member's card points for premiums or card points of the collaborating company, changing to member's card points according to the broadcast points included in the package information, and transmitting and receiving package information can be mentioned.

Credit company data base 1008 is a data base managed by the credit card company. Credit company data base 1008 is a data base for accumulating information about members such as member's card points. The user of television receiver 1003 is able to become a member. Credit company data base 1008 transmits viewing record information stored in package information to broadcasting station data base 1001. Also, credit company data base 1008 makes the adjustment between it and broadcasting station data base 1001 with respect to the fare or the amount equivalent to the points changed when the broadcast points are changed into card points.

Television receiver 1003 in normal operation displays television pictures based on television signals on the television screen. Also, television receiver 1003 uses a broadcast browser to prepare data broadcast (defined by software program down-loaded) pictures that can be recognized by the user according to the data broadcast included in the television signals. Thus, television receiver 1003 superposes the data broadcast picture on the television picture or displays the picture on the television screen together with the television picture. Also, television receiver 1003 uses a communication browser to display home page information obtained from information server 1006 or credit card member information server 1007. In that case, the home page information is superposed on the television picture or displayed on the television screen together with the television picture.

Also, television receiver 1003 prepares package information on the basis of the package information producing contents included in the television signals, and transmits the prepared package information to credit card member information server 1007 in accordance with the instruction of the user.

In the above description, television receiver 1003 transmits the prepared package information to credit card member information server 1007, but it is also preferable to transmit broadcast points, viewing records, equipment ID, and company ID to broadcasting station member information server 1005 and to receive the package information based on the information from broadcasting station member information server 1005.

Also, television receiver 1003 obtains package information producing contents from television signals, but it is also preferable to obtain the contents via a communication network or CATV network instead. For example, broadcasting station member information server 1005 is preferable to transmit package information producing contents to television receiver 1003.

Also, package information is transmitted from television receiver 1003 directly to credit card member information server 1007 in the example shown. However, package information is preferable to be once down-loaded to other terminal such as a portable telephone or a personal computer that can be connected to communication network 1004 and transmitted from other terminal indirectly to credit card member information server 1007. Also, the credit card company shown is an example of company other than the broadcasting company, and it is also preferable to be other company such as an airplane company, a sales company or a bank. Also, card points are preferable to be other items, for example, miles of an airplane company.

Figure 2:
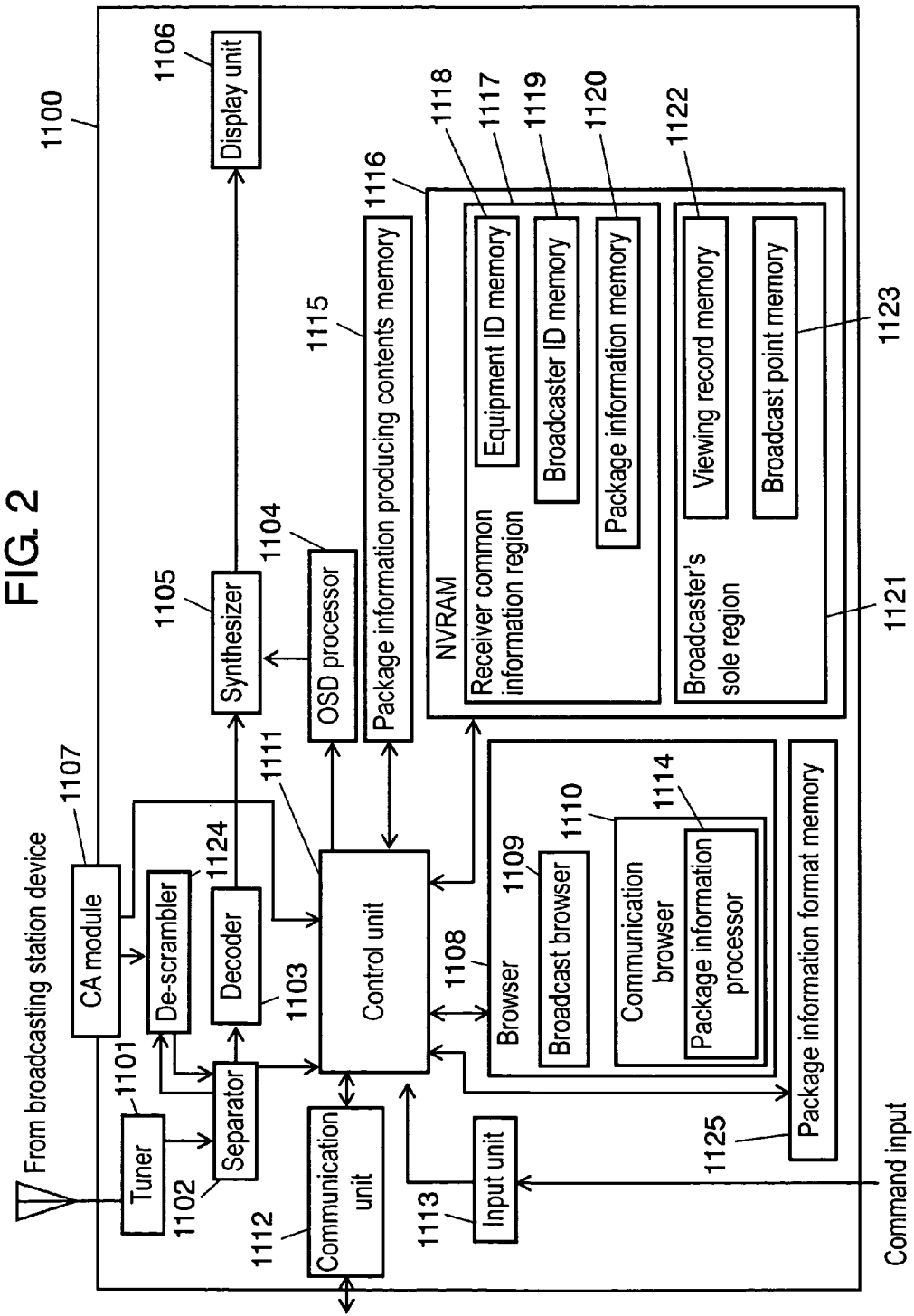
FIG. 2 is a block diagram showing a configuration of a television receiver in one preferred embodiment of the present invention.

FIG. 2 is a block diagram showing the configuration of television receiver 1100 in the preferred embodiment 1 of the present invention. Television receiver 1100 comprises tuner 1101, separator 1102, decoder 1103, OSD (On Screen display) processor 1104, synthesizer 1105, display unit 1106, CA module 1107, browser 1108, broadcast browser 1109, communication browser 1110, control unit 1111, communication unit 1112, input 1113, package information processor 1114, package information producing contents memory 1115, NVRAM 1116, receiver common information region 1117, equipment ID memory 1118, broadcaster ID memory 1119, package information memory 1120, broadcaster's sole region 1121, viewing record memory 1122, broadcast point memory 1123, de-scrambler 1124, and package information format memory 1125.

Tuner 1101 extracts the signal in the frequency band selected by the user out of the television signals transmitted from broadcasting station device 1002, and outputs the signal as a transport stream. Separator 1102 separates the transport stream output from tuner 1101 into digital video signal, digital audio signal, data broadcast signal, and control signal. De-scrambler 1124, when the transport stream is scrambled, de-scrambles the transport stream inputted from separator 1102 and outputs the transport stream. CA module 1107 stores de-scrambling decoder key and CA module ID. The decoder key is outputted to de-scrambler 1124, and CA module ID is read out of control unit 1111. Decoder 1103 decodes the analog video signal and analog audio signal in accordance with the coded digital video signal and digital audio signal outputted from separator 1102. OSD processor 1104 outputs OSD display signal in accordance with the OSD control signal outputted from control unit 1111 and drawn on a buffer memory. The buffer memory is not shown. Synthesizer 1105 synthesizes the analog video signal outputted from decoder 1103 with the OSD display signal outputted from OSD processor 1104. Display unit 1106 displays the analog video signal outputted from synthesizer 1105 on the screen. The analog audio signal outputted from decoder 1103 is outputted from the audio output. The audio output unit is not shown.

Control unit 1111 serves to control in various ways with respect to television receiver 1100. Communication unit 1112 transmits and receives information as communication signals between broadcasting station member information server 1005, information server 1006, and credit card member information server 1007 under the control of control unit 1111. The information transmitted and received is the data or home page information such as package information, broadcast points, equipment ID, and broadcaster ID. Input 1113 is an input unit for inputting commands from the user. Input 1113 delivers the command input signal to control unit 1111 in accordance with the command input from the user.

Browser 1108 is furnished with broadcast browser 1109 and communication browser 1110. Broadcast browser 1109 receives the data broadcast signal output from separator 1102 under the control of control unit 1111 and builds up a screen defined by a software program in data broadcast or the like. The data broadcast signal includes a signal including the software program down-loaded. The screen is built up in such manner that contents included in the data broadcast signal are set up according to the result of analyzing the XML definition file in the data broadcast signal by control unit 1111. The data broadcast screen is outputted from control unit 1111 and displayed by using OSD processor 1104. The communication browser receives the communication signal output from communication unit 1112 under the control of control unit 1111 and builds up a home page screen. The home page screen is built up in such manner that contents included in the communication signal are set up according to the result of analyzing the HTML definition file in the communication signal by control unit 1111. The home page screen is outputted from control unit 1111 and displayed by using OSD processor 1104. Package information processor 1114 is an interface for receiving the package information read out by control unit 1111 and stored in package information memory 1120 so that the information can be used by communication browser 1110. Communication browser 1110 is capable of transmitting the package information obtained from package information processor 1114 under the control of control unit 1111 to credit card member information server 1007 connected in such manner as to enable communication by using communication unit 1112.

Package information producing contents memory 1115 stores the package information producing contents included in the data broadcast signal outputted from separator 1102 under the control of control unit 1111. The package information producing contents will be described later. Package information format memory 1125 stores the format of package information. The format of package information will be described later.

NVRAM 1116 is a non-volatile memory capable of reading and writing data under the control of control unit 1111. NVRAM is the abbreviation of Non-Volatile RAM. NVRAM 1116 is partitioned by receiver common information region 1117 and broadcaster's sole region 1121. Receiver common information region 1117 is a region freely accessible for application software that is the application software program installed in television receiver 1003. Broadcaster's sole region 1121 is a sole region accessible only for contents transmitted from the broadcaster.

Receiver common information region 1117 is a region maintained in NVRAM 1116 for storing common information freely accessible for applications installed in television receiver 1100. Equipment ID memory 1118 stores inherent equipment ID of television receiver 1100. As equipment ID, for example, it can be considered that CA module ID or serial number in manufacturing equipment is used. Broadcaster ID memory 1119 stores inherent broadcaster ID of the broadcaster. As broadcaster ID, for example, it can be considered that broadcaster_id stored in BIT (Broadcaster Information Table) that is one of the service information data broadcast in a digital television broadcast is used. Broadcaster_id is also used for gaining compatibility between the broadcaster's sole region and broadcaster as mentioned in "Application of NVRAM commonly used in MM services" (ARIB TR-B15 Vol. 1, Chap. 3, 8.2). Package information memory 1120 stores package information.

Broadcaster's sole region 1121 includes the broadcaster's sole region mentioned in "Application of NVRAM commonly used in MM services) (ARIB TR-B15 Vol. 1, Chap. 3, 8.2). Applications installed in television receiver 1100 are not freely accessible to broadcaster's sole region 1121. Only contents of the broadcaster having compatibility are accessible to broadcaster's sole region 1121. Viewing record memory 1122 stores the user's record of viewing programs of the broadcaster from the viewing record obtaining contents transmitted by the broadcaster. Broadcast point memory 1123 stores the broadcast points counted according to the program viewing time from the broadcast points counting contents transmitted by the broadcaster. The viewing record and broadcast points are the inherent information of the broadcaster.

In the above description, television receiver 1100 comprises receiver common information region 1117 and broadcaster's sole region 1121 in common NVRAM 1116, but these are also preferable to be separate memories in the configuration.

Also, package information is transmitted and received by using communication unit 1112, but it is also preferable that control unit 1111 comprises an interface of storage medium such as a memory card capable of writing and reading package information in order to input and output the information through the storage medium.

Also, XML based on a multi-media coding system is shown just as an example of data broadcast describing system, and it is also preferable to adopt other systems such as BML and HTML.

Also, broadcast points are counted according to the program viewing time from the broadcast points counting contents transmitted by the broadcaster, but the object is just to accumulate the points by using the contents transmitted by the broadcaster, and it is also preferable to use other method of accumulation, for example, counting the marks obtained in games or quizzes.

In television receiver 1100, when a screen other than the television picture is displayed on the television screen, control unit 1111 produces OSD control signal for producing a screen other than the television picture, and outputs the produced OSD control signal to OSD processor 1104. In this way, data broadcast (defined by software program) screen, home page screen, and command input screen are displayed on the television screen in such manner as being superposed on the television picture or together with the television picture.

Figure 3:
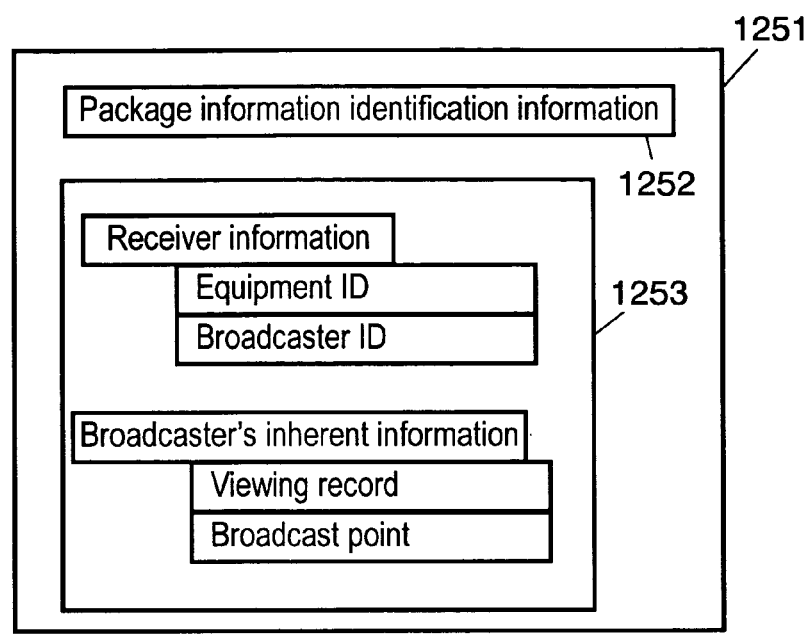
FIG. 3 shows package information in one preferred embodiment of the present invention.

FIG. 3 shows package information stored in package information memory 1120. Package information basic unit 1253 comprises equipment ID and broadcaster ID as receiver information, and viewing record and broadcast points as broadcaster's inherent information. The information is preferable to be coded. Package information header 1252 stores information showing that package information 1251 is package information.

The package information format and coding system mentioned above are predetermined in the digital broadcasting system shown in FIG. 1, and package information can be identified and coded in the digital broadcasting system. In television receiver 1100, the package information format is preferable to be previously stored in package information format memory 1125 before delivery, and written by software down-loading after delivery or written in the package information producing contents. Package information is produced by package information producing contents. In transmitting and receiving package information, it is probably easy to store package information in the data region of communication packet in accordance with various communication protocols.

Credit card member information server 1007 receives package information. And, when credit card member information server 1007 identifies the package information by package information header 1252, it decodes the information in package information basic unit 1253 to extract equipment ID and broadcaster ID as receiver information, and viewing record and broadcast points as broadcaster inherent information. Credit card member information server 1007 is capable of changing broadcast points into card points by using broadcaster ID. Credit card member information server 1007 is able to specify the relevant broadcaster by using broadcaster ID. Broadcasting station data base 1001 is able to specify the member originally transmitting the package information. Accordingly, it is possible to make the adjustment between credit card member information server 1007 and broadcasting station data base 1001 with respect to the fare or the amount equivalent to the points changed when the broadcast points are changed into card points.

Figure 4:
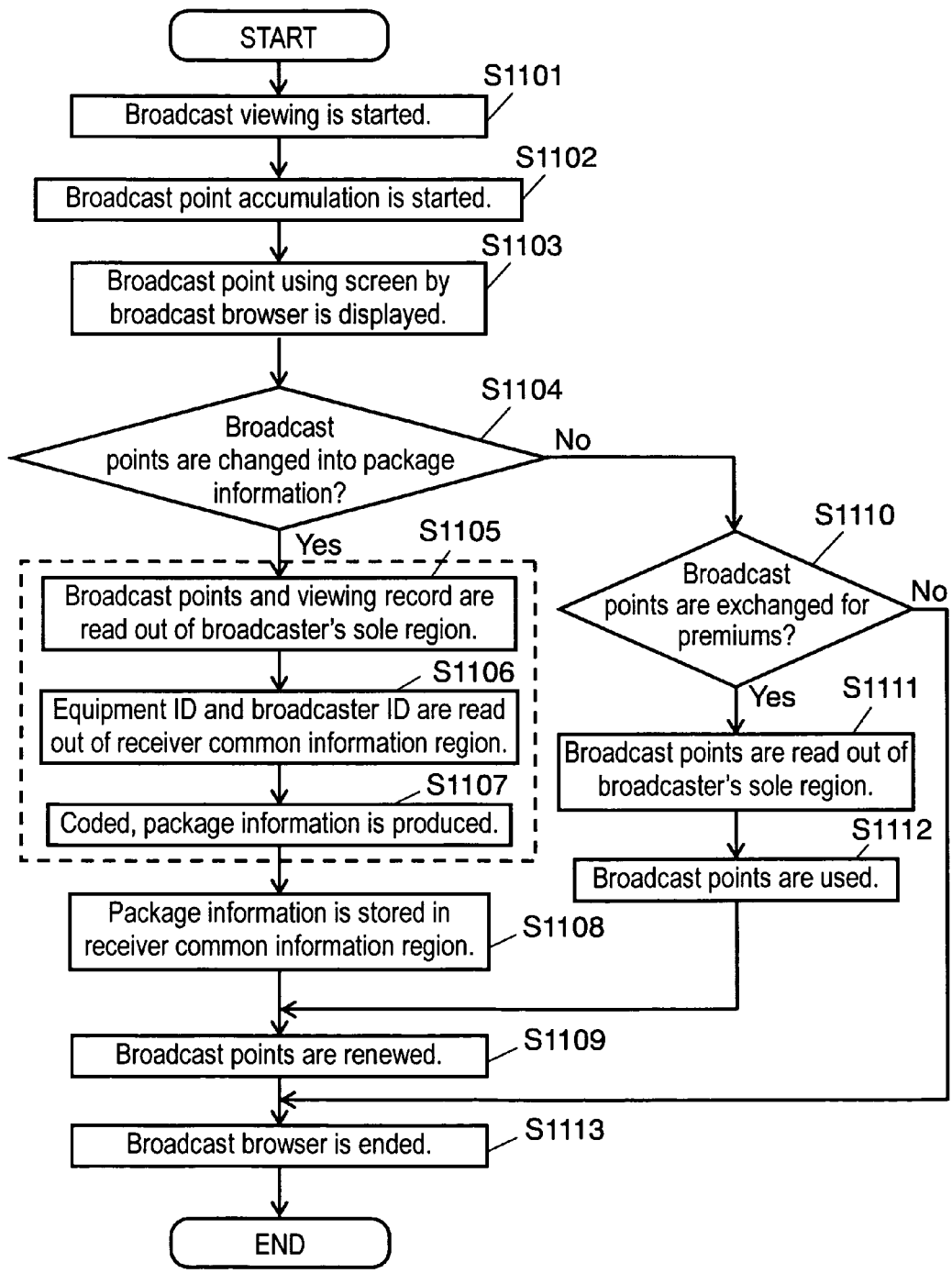
FIG. 4 is the first flow chart for producing and storing package information in one preferred embodiment of the present invention.

FIG. 4 is the first flow chart showing a process of producing and storing package information by television receiver 1100 in the preferred embodiment 1 of the present invention. Control unit 1111 of television receiver 1100 executes the following processes when tuner 1101 receives a television broadcast and the user starts to view the broadcast (step S1101).

Control unit 1111 uses tuner 1101 and separator 1102 to separate the program contents stream, data broadcast data, package information producing contents, viewing record obtaining contents, and broadcast points counting contents data from the transport stream received. The data broadcast includes a software program or the like to be down-loaded. The viewing record obtaining contents and broadcast points counting contents are processed according to the command in the data broadcast signal, and the viewing record and the broadcast points are respectively accumulated in viewing record memory 1122 and broadcast point memory 1123 in accordance with the broadcasts viewed (step S1102). After that, the user is able to start up a broadcast browser by using an optional input 1113 and to display the broadcast point using screen of the data broadcast defined by the software program (step S1103).

Figure 7:
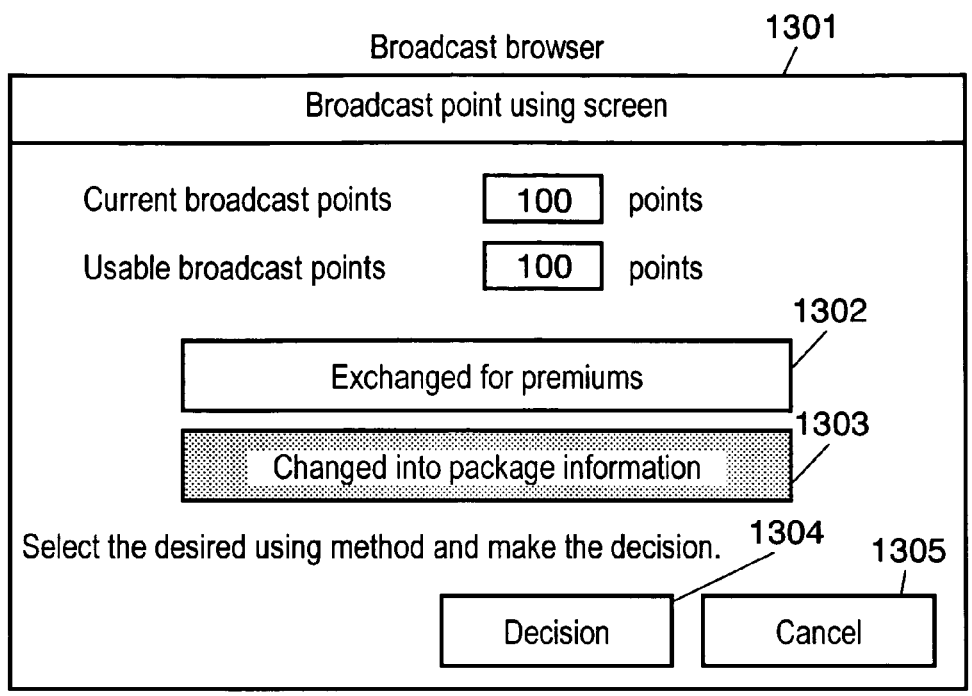
FIG. 7 shows a screen for to using broadcast points in one preferred embodiment of the present invention.

The broadcast point using screen will be described in the following by using FIG. 7. FIG. 7 shows a broadcast point using screen with use of a broadcast browser. The configuration is defined by XML data of the data broadcast transmitted from broadcasting station device 1002. Broadcast point using screen 1301 displays the number of points already accumulated and the number of points usable in this range. Also, as the buttons for selecting the using method, button 1302 for selecting the process of exchanging with premiums and button 1303 for selecting the process of changing the points into package information are displayed. Also displayed is decision button 1304 for executing the process selected by button 1302 or button 1303. Also, button 1305 for canceling broadcast point using screen 1301 is displayed.

When the user decodes to change the broadcast points into package information and selects button 1303 by using input 1113 and pushes button 1304, then the broadcast browser proceeds to the broadcast point changing into package information screen according to the command in the data broadcast signal.

Figure 8:
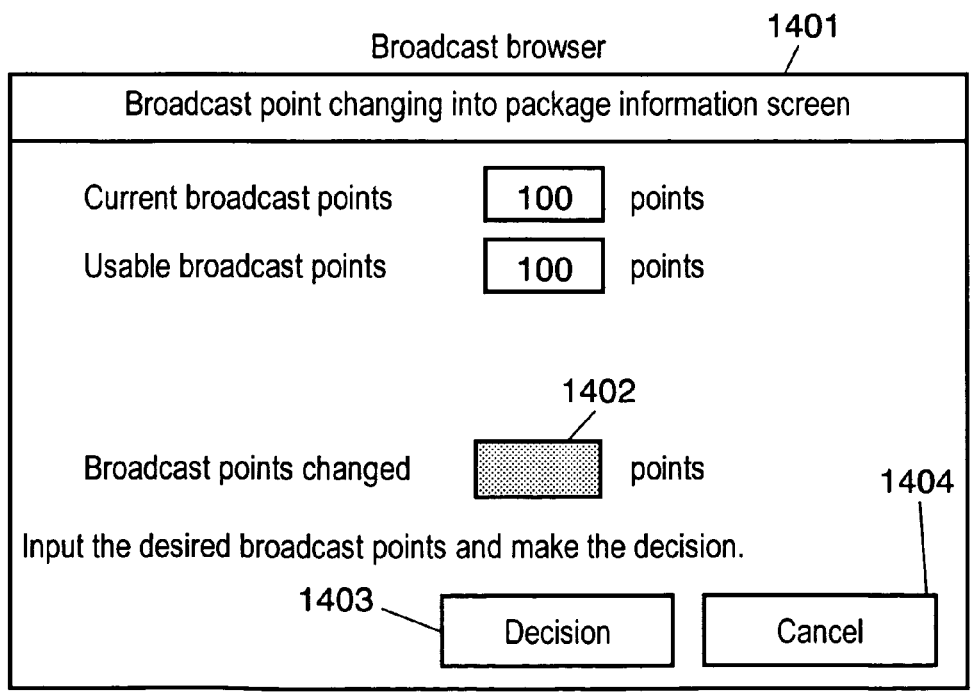
FIG. 8 shows a screen for converting broadcast points into package information in one preferred embodiment of the present invention.

The broadcast point changing into package information screen will be described in the following by using FIG. 8. FIG. 8 shows a screen of changing broadcast points into package information by a broadcast browser. The configuration is defined by XML data of the data broadcast transmitted from broadcasting station device 1002. Broadcast point change into package information screen 1401 displays the number of points already accumulated and the number of points usable in this range. Also, window 1402 used for inputting the number of broadcast points changed into package information is displayed. The user is able to input the number of points within the range of the number of changeable points by using input 1113. Also displayed is button 1403 that is decision button 1403 for executing the package information changing process in accordance with the number of broadcast points inputted to window 1402. Also, cancel button 1404 for canceling the broadcast point change into package information screen 1401 is displayed.

When the user uses input 1113 to input the number of points in window 1402 and pushes button 1403, then in FIG. 4, step S1104 proceeds in the direction of YES for executing the package information producing contents. With the package information producing contents processed, the broadcast points and viewing record are read out of broadcaster's sole region 1121 (step S1105). Equipment ID and broadcaster ID are read out of receiver common information region 1117 (step S1106). The information is coded as specified, and package information basic unit 1253 is formed, and package information header 1252 conforming to the package information format is added thereto, thereby producing package information (step S1107). The package information format is preferable to be mentioned in the package information producing contents. As is obvious in the above description, the package information producing contents in this embodiment are a software program for inputting broadcast points, viewing record, equipment ID and broadcaster ID to produce package information in order to execute the process shown by dotted line in FIG. 4 for outputting package information. It can be considered that other processes are executed by the software program provided in television receiver 1100 and that the software program is stored in control unit 1111.

Figure 9:
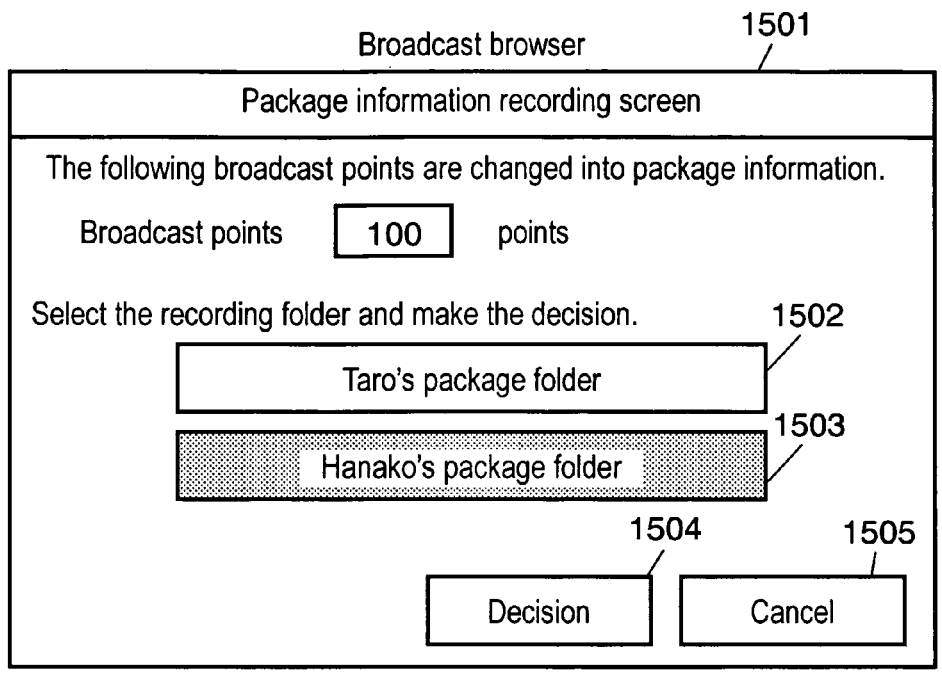
FIG. 9 shows a screen for storing package information in one preferred embodiment of the present invention.

When package information is outputted from package information producing contents, the screen changes to a screen for storing package information according to the command in the data broadcast signal. The package information storing screen is described here by using FIG. 9. FIG. 9 shows a screen of storing package information by broadcast browser. The configuration is defined by XML data of the data broadcast transmitted from broadcasting station device 1002.

Package information storing screen 1501 displays the number of broadcast points changed into package information. Also, as buttons used for selecting a folder for storing package information, button 1502 for storing the information in Taro's package folder and button 1503 for storing the information in Hanako's package folder are displayed. Also displayed is decision button 1504 for executing the process selected by button 1502 or button 1503. Also, button 1505 for canceling the package information storing screen 1501 is displayed.

The user is able to select a package information storing folder by using input 1113. Button 1502 and button 1503 are respectively corresponding to the specified regions of package information memory 1120 although it is not shown. The display contents of the button 1502 and button 1503 are determined according to the folder name set by the user in the initial setting screen not shown. The user is able to make a plurality of folders of each family by setting the initial screen. The user selects button 1502 or button 1503 by using input 1113. According to the selection, control unit 1111 stores the package information produced in step S1107 in the specified region of package information memory 1120 (step S1108).

The broadcast points are reduced by the number of broadcast points changed into package information, renewed and written in broadcast point memory 1123 (step S1109). Through the above steps, the process of changing broadcast points into package information and storing the information in package information memory 1120 is completed. And, the user ends the broadcast browser (step S1113).

In the above process, it is of significance that the broadcast points in broadcaster's sole region 1121 are changed into package information by processing the package information producing contents transmitted by the broadcaster and stored in receiver common information region 1117 of the television receiver, and thereby, the broadcast point information can be used as needed from a communication browser that is an application of television receiver 1100.

In step S1104, when the user pushes button 1302 for exchanging the broadcast points with premiums, step S1110 proceeds in the direction of YES. In this case, step S1111 and step S1112 are same as in the content shown in "Application of NVRAM commonly used in MM services" (ARIB TR-B15 Vol. 1, Chap. 3, 8.2), and the description is omitted.

Figure 5:
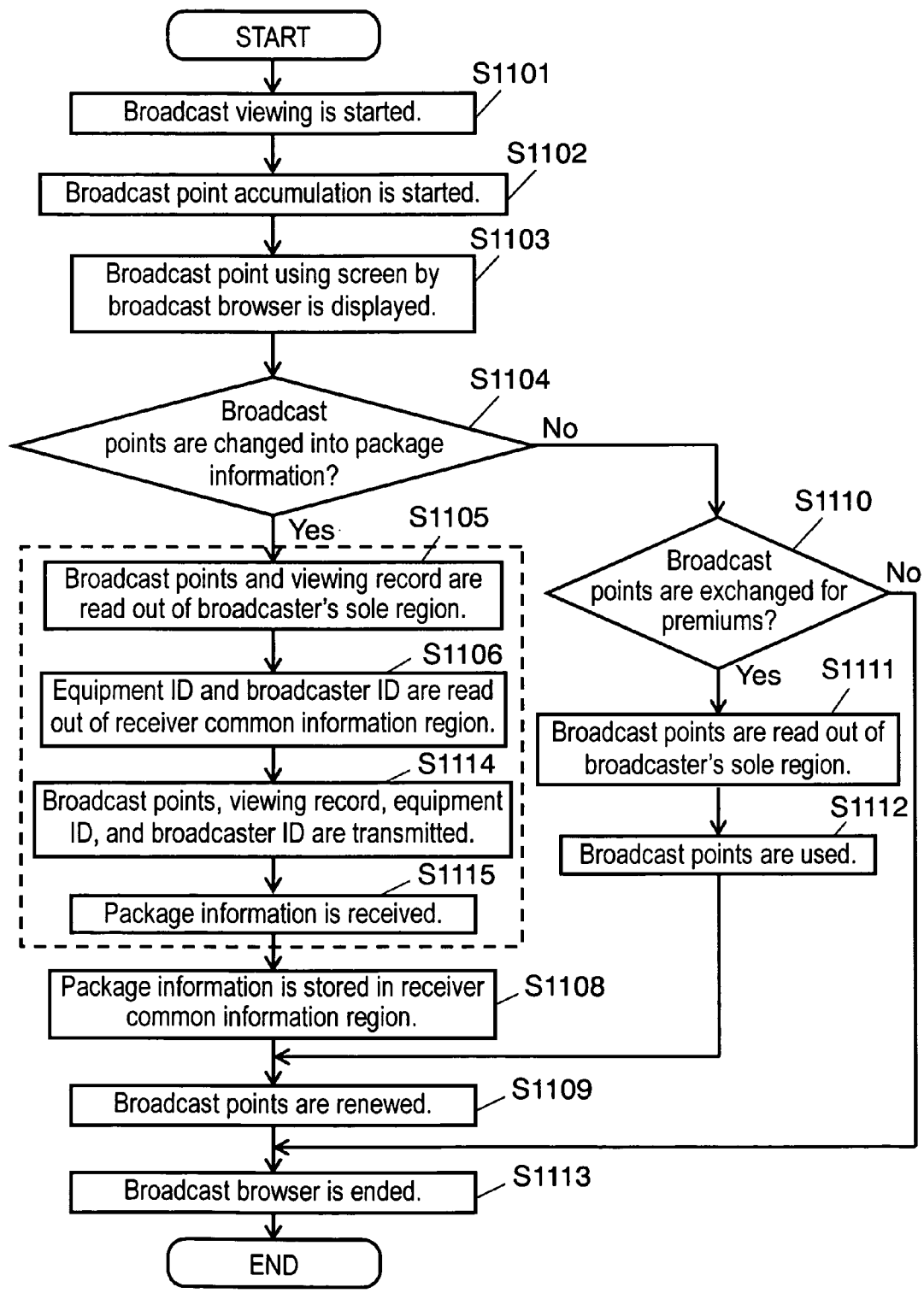
FIG. 5 is the second flow chart for producing and storing package information in one preferred embodiment of the present invention.

Another example of processing the package information producing contents will be described in the following by using FIG. 5. FIG. 5 is the second flow chart showing the process of producing and storing package information by television receiver 1100 in the preferred embodiment 1 of the present invention. Only the difference from the flow chart of FIG. 4 is described here. The difference is in the detail of processing package information producing contents shown by dotted line in the figure.

The steps after YES of step S1104 will be described in the following. The package information producing contents are processed according to the same process as in FIG. 4. As the package information producing contents are processed, the broadcast points and viewing record are read out of broadcaster's sole region 1121 (step S1105), and equipment ID and broadcaster ID are read out of receiver common information region 1117 (step S1106). The information thereafter is transmitted to broadcasting station member information server 1005 by using communication unit 1112 (step S1114). In the process executed by broadcasting station member information server 1005, although it is not shown, the broadcast points, viewing record, equipment ID, and broadcaster ID received are coded as specified, forming package information basic unit 1253, and package information header 1252 conforming to the package information format is added thereto, thereby producing package information. The package information producing contents are then in standby mode and receives the package information produced and transmitted by broadcasting station member information server 1005 (step S1115). As is obvious in the above description, the package information producing contents in this embodiment are a software program for executing the process shown by dotted line in FIG. 5. That is, the package information producing content receives the broadcast points, viewing record, equipment ID, and broadcaster ID, transmits them to broadcasting station member information server 1005 and receives the package information produced by broadcasting station member information server 1005, and outputs the package information.

Broadcasting station data base 1001 is preferable to obtain the viewing record from the information transmitted in step S1114. In this case, since there is no need of including the viewing record in the package information, package information basic unit 1253 is preferable to be formed of information such as broadcast points, equipment ID and broadcaster ID, omitting the viewing record.

Figure 6:
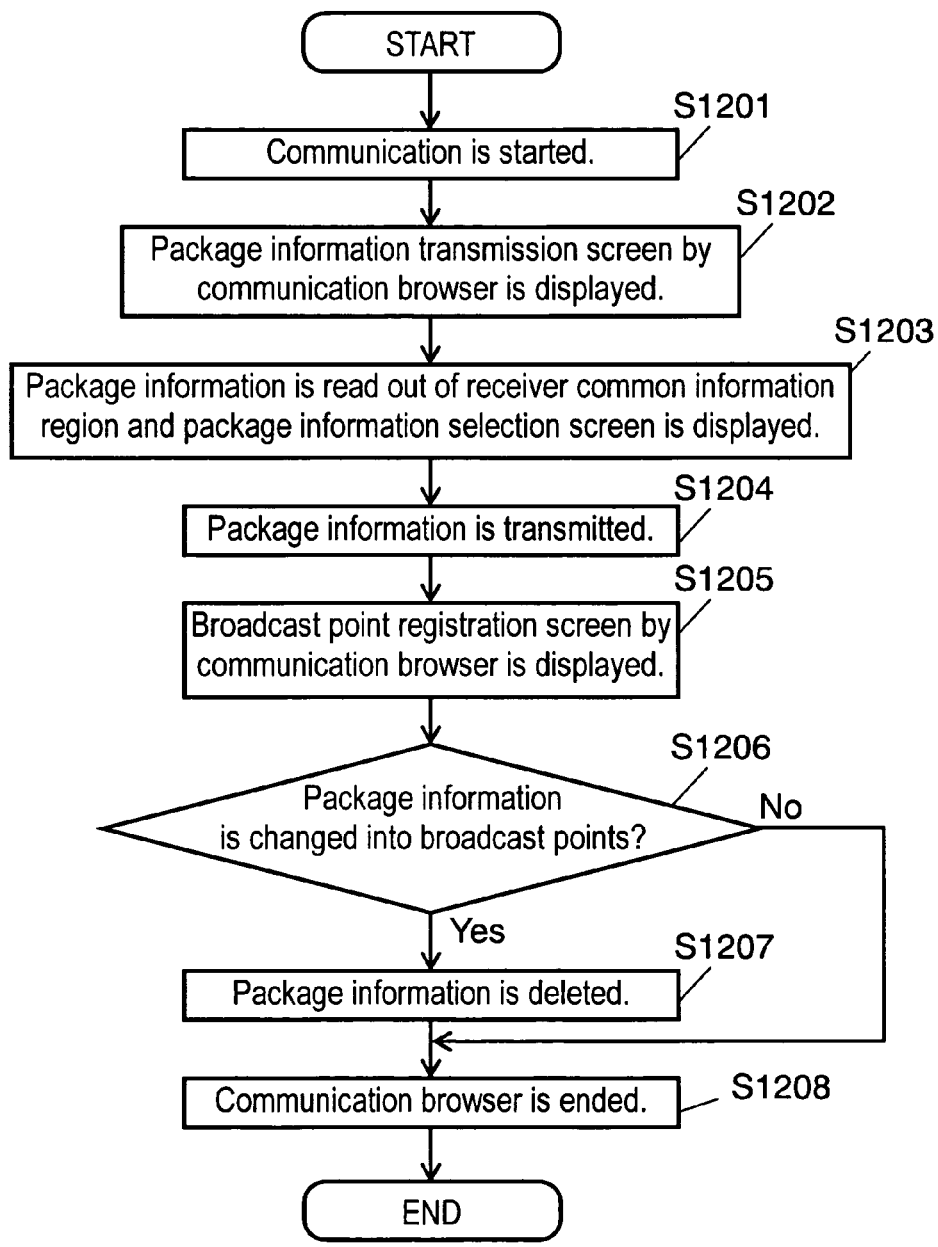
FIG. 6 is a flow chart showing a process of using package information in one preferred embodiment of the present invention.

FIG. 6 is a flow chart showing the process of using the package information stored in package information memory 1120 in the preferred embodiment 1 of the present invention by using communication browser 1110. Particularly, in this example, supposed is such a using method that broadcast points are exchanged for card points to be exchanged for premiums of the credit card company. Control unit 1111 of television receiver 1100 executes the following processes when communication unit 1112 receives communication signals (step S1201).

The user is able to make connection with credit card member information server 1007 via communication network 1004, to gain access to home page by using communication browser 1110, and to display the page of communication screen of the package information (step S1202).

Figure 10:
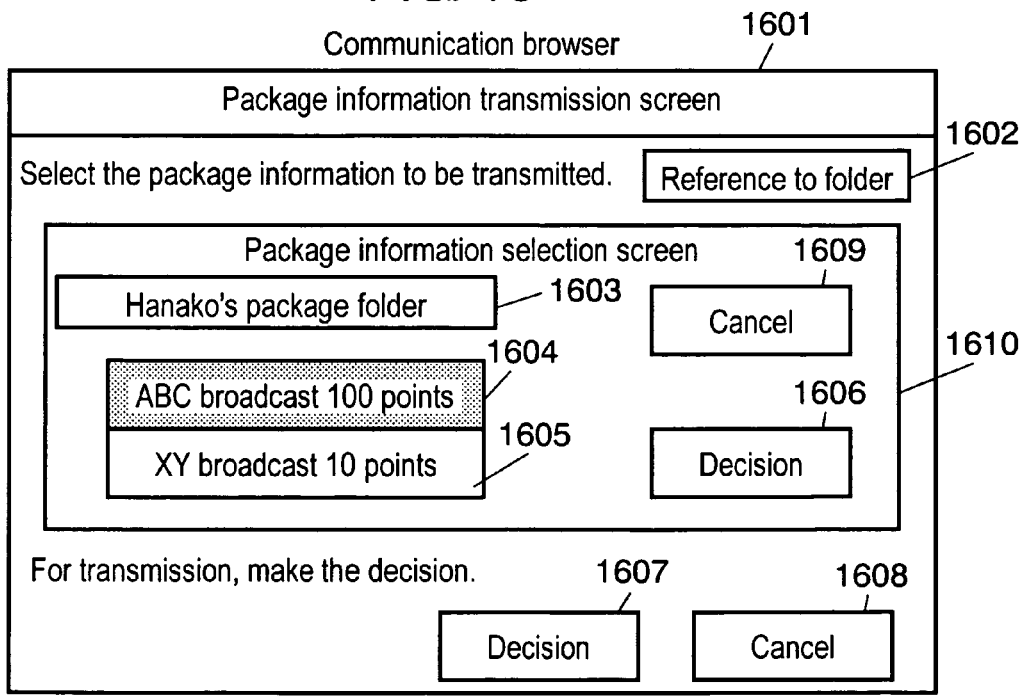
FIG. 10 shows a screen for transmitting package information in one preferred embodiment of the present invention.

The communication screen of package information will be described in the following by using FIG. 10. FIG. 10 shows a communication screen of package information by communication browser 1110. The configuration is defined by HTML data of communication signal transmitted from credit card member information server 1007.

Package information transmission screen 1601 displays button 1602 used for referring to the place where package information to be transmitted is stored. When the user pushes button 1602 by using input 1113, control unit 1111 reads the folder stored in package information memory 1120 and the package information in the folder. In this way, control unit 1111 uses OSD processor 1104 to display package information selection screen 1610 on package information transmission screen 1601 so that the user is able to select the package information (step S1203). Package information selection screen 1610 includes button 1603 showing the folder name, button 1604 and button 1605 showing the package information stored in the folder, button 1606 for deciding to select the package information, and button 1609 for canceling package information selection screen 1610. The user is able to select button 1604 or button 1605 by using input 1113 to select the package information to be transmitted.

When the user pushes button 1607, deciding to select the package information and to transmit the signal, the package information selected is inputted to the communication browser from package information processor 1114 and transmitted to credit card member information server 1007 by using communication unit 1112 (step S1204). Credit card member information server 1007 confirms the reception of package information and outputs the broadcast points registration screen. Television receiver 1100 receives the broadcast points registration screen from communication unit 1112, and displays the broadcast points registration screen by using communication browser 1110 under the control of control unit 1111 (step S1205).

Figure 11:
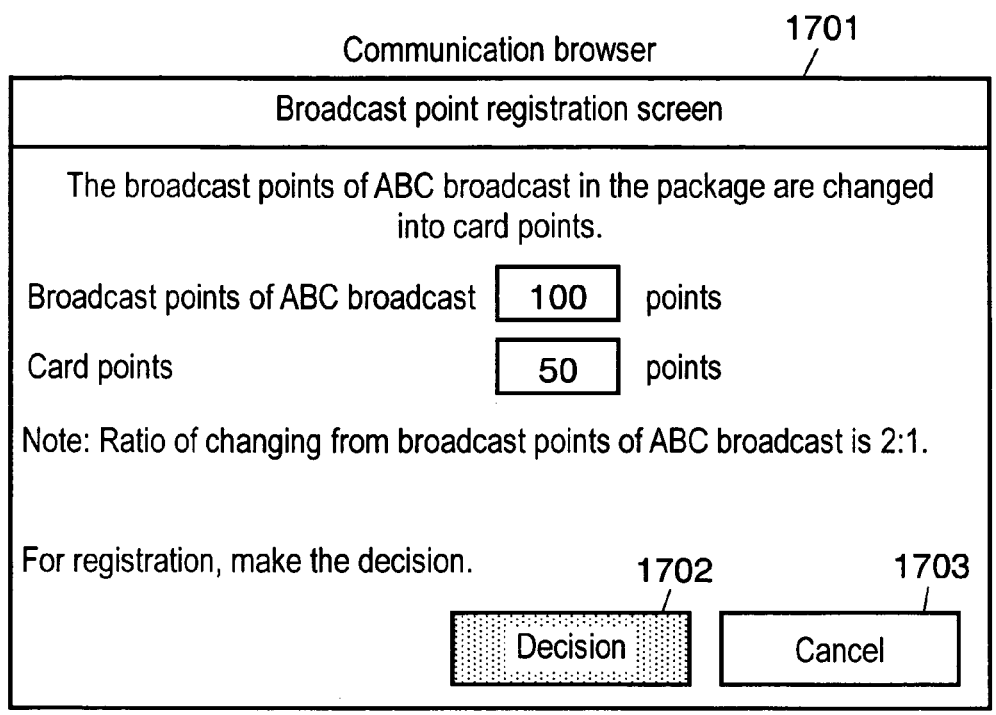
FIG. 11 shows a screen for registering broadcast points in one preferred embodiment of the present invention.

The broadcast points registration screen will be described in the following by using FIG. 11. FIG. 11 shows a broadcast points registration screen by communication browser 1110. The configuration is defined by HTML data of communication signal transmitted from credit card member information server 1007. The number of broadcast points, broadcaster's name, and the number of changeable card points in the package information inputted and transmitted from package information processor 1114 are coded and displayed on broadcast points registration screen 1701. Also displayed is button 1702 that is decision button 1702 for executing the broadcast points changing into card points and registering process. And, cancel button 1703 for canceling the broadcast points registration screen 1701 is also displayed.

When the user pushes button 1702 by using input 1113, deciding to change the broadcast points into card points and to register them, then in FIG. 6, step S1206 proceeds in the direction of YES. In credit card member information server 1007, the process of changing broadcast points into card points of the user is executed, and the result is transmitted to credit company data base 1008. The viewing record in the package information is transmitted from credit company data base 1008 to broadcasting station data base 1001.

In credit card member information server 1007, when the user confirms that the process of changing the broadcast points into card points of the user has been normally completed, control unit 1111 eliminates the transmitted package information from package information memory 1120 (step S1207). This confirmation can be done by control unit 1111 using communication browser 1110 and communication unit 1112 to receive the command for confirming the process completion from credit card member information server 1007. In case control unit 1111 fails to confirm and judges that the process of changing the broadcast points into card points is not normally completed, step S1206 proceeds in the direction of NO, and then the package information will not be eliminated.

Through the above process, changing the broadcast points into card points is completed. And, the user ends the display of communication browser (step S1208).

In the above process, it is of significance that package information can be transmitted to credit card member information server 1007 that is a server of a company other than the broadcasting company. Thus, the broadcast points become usable at credit card member information server 1007. Also, since package information includes broadcaster ID, equipment ID, and viewing records, credit card member information server 1007 is able to specify the relevant broadcaster by using broadcaster ID. Also, broadcasting station data base 1001 is able to specify the member of the sender of the package information by using equipment ID. Accordingly, the transmission of viewing records and the adjustment of the fare or the amount equivalent to the points changed in changing the broadcast points into card points can be performed between credit card member information server 1007 and broadcasting station data base 1001.

As described above, in the television receiver and digital broadcasting system of the present invention, broadcast points in the broadcaster's sole region are changed into package information by processing the contents transmitted by the broadcaster, and the package information is stored in the receiver common information region of the television receiver. In this way, it becomes possible to see and use the information of broadcast points from a communication browser that is an application of the television receiver. Also, package information can be transmitted to the server of a company other than the broadcasting company by using a communication browser. Thus, broadcast points can also be used for services offered by a company other than the broadcasting company.

Accordingly, it is possible to solve such problems that other company is unable to provide the user of the television receiver with a service of using broadcast points accumulated in the receiver and that the television receiver is unable to provide the service offered by a company other than the broadcasting company with a function of using broadcast points.

Also, there are advantages for the user such that the range of using broadcast points widens and the utility value is enhanced. For the broadcaster, there are cost advantages such that the service costs can be dispersed to other companies. And it is possible for the maker to increase the amount of sales as a result of increase in sales of high-priced compatible television receivers because the users highly appreciate the values of data broadcasting function and mutually-directional function. Due to the advantages for the user, the broadcaster, and the maker, it gives rise to the propagation and acceleration of digital broadcast.

Preferred Embodiment 2

In the above configuration, the software program specified and transmitted by a broadcaster is stored in a common region in the television receiver. The terminal software program installed in the television receiver can be freely down-loaded and accessed, and it is possible to analyze or alter the program. Accordingly, when a CA software program having CA (Conditional Access) function the broadcaster wants it to be confidential is down-loaded from the broadcaster, there arises a problem such that the CA software program is altered and it is unable to maintain the anti-tampering characteristic. On the other hand, it can be considered that the broadcaster changes such CA function into a security module and offer it to the user in order to maintain the anti-tampering characteristic. In that case, there is a problem of the cost of the security module itself. Also, in the broadcasting industry, the CA equipment and system often vary depending upon the markets and districts, and in case of removal, for example, there arises a problem that the user has to spend time and expenses for replacing the security module.

Figure 12:
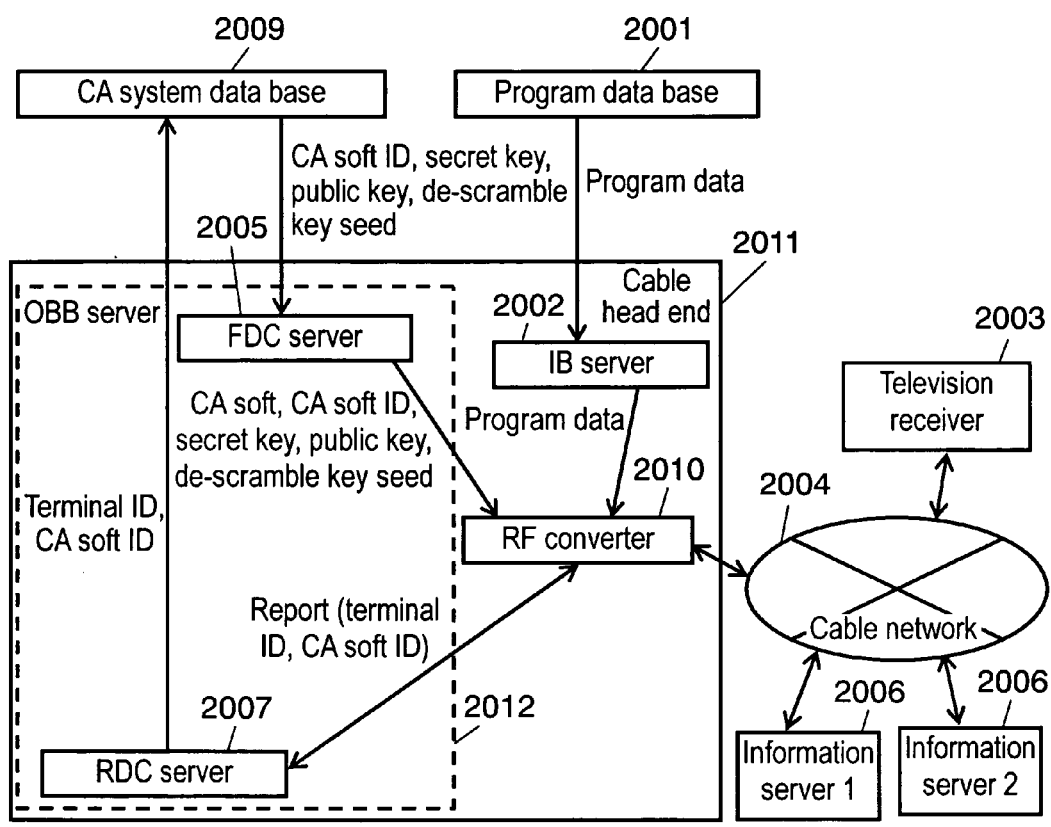
FIG. 12 is a configuration of a digital broadcasting system for cable television in other embodiment of the present invention.

The preferred embodiment 2 of the present invention will be described in the following with reference to the drawings. FIG. 12 shows the configuration of a digital broadcasting system of cable television in the preferred embodiment 2 of the present invention. The system shown in FIG. 12 comprises program data base 2001, IB (In Band) server 2002, television receiver 2003, FDC (Forward Data Channel) server 2005, a plurality of information servers 2006, RDC (Reverse Data Channel) server 2007, CA system data base 2009, RF converter 2010, and cable network 2004. Also, FDC server 2005 and RDC server 2007 are disposed in OOB (Out of Band) server 2012. Also, OOB server 2012, IB server 2002, and RF converter 2010 are disposed in cable head end 2011.

For the details of IB (In Band), FDC (Forward Data Channel), RDC (Reverse Data Channel), and OOB (Out of Band), the descriptions are given in ANSI/SCTE 40 2004 that is the American National Standards, and DOCSIS Set-top Gateway (DSG) Interface Specification SP-DSG-I01-020228 that is the Open Cable Standards.

Television receiver 2003, and information server 2006, FDC server 2005, and RDC server 2007 are connected via cable network 2004 and RF converter 2010 in such manner as to enable communication with each other. Also, program data base 2001, IB server 2002, CA system data base 2009, FDC server 2005, and RDC server 2007 are connected by exclusive cables at all times. Only one television receiver 2003 is shown in FIG. 12, but the system shown in FIG. 12 actually includes a plurality of television receivers 2003.

FDC server 2005 is a server managed by a cable company (cable operator) that is a cable television broadcasting company. FDC server 2005 supports various processes for using services offered to the user of television receiver 2003 by the cable company. Necessary data are transmitted to television receiver 2003 from FDC server 2005 in cable head end 2011 via RF converter 2010 and cable network 2004, using FDC (Forward Data Channel) band. As the data transmitted, for example, EMM (Entitlement Management Message) for registering viewer contracts or offering de-scramble key seed, data for offering program tables, various messages, and CA software programs down-loaded, related CA soft ID, secret key, and public key data can be mentioned. The CA software program down-loaded is a software program certified by the cable company. The CA software program includes a software program for producing package information to produce package information out of inherent information such as CA soft ID, secret key, and public key data.

Program data base 2001 is a data base managed by a cable company. Program data of digital television broadcasts are accumulated and managed.

IB server 2002 is a server managed by a cable company. Necessary data are transmitted to television receiver 2003 from IB server 2002 in cable head end 2011 via RF converter 2010 and cable network 2004, using IB (In Band) band. IB server 2002 receives the program data of television broadcast from program data base 2001, and transmits the data to television receiver 2003. It can be considered that the program data is of compressed MPEG 2-TS format.

RDC server 2007 is a server managed by a cable company. RDC server 2007 supports various processes for using services offered to the user of television receiver 2003 by the cable company. Necessary data are transmitted from television receiver 2003 to RDC server 2007 in cable head end 2011 via cable network 2004 and RF converter 2010, using RDC (Reverse Data Channel) band. As the data transmitted, for example, package information for reporting a process of application for viewing video-on-demand, both-direction program table processing, terminal ID (Host ID) to be registered or ID (CA soft ID) of CA software program can be mentioned. The package information includes CA soft ID and terminal ID. RDC server 2007 transmits CA soft ID and terminal ID to CA system data base 2009 via an exclusive line.

CA system data base 2009 is a data base managed by a cable company. When the user of television receiver 2003 concludes a viewer contract, the user information is registered. The user information is such information as is related to information about viewer environment and viewer contract such as the terminal ID and CA soft ID of television receiver 2003 used by the user, and the viewing plan in the user's contract. Also, the secret key, public key, and de-scramble key seed are accumulated, which are managed in accordance with the user information. A revoke list for discriminating illegal copy terminals and CA software programs is also accumulated. Also executed is a process of collating the terminal ID and CA soft ID of television receiver 2003 receiving the information from RDC server 2007 with the revoke list. Terminals and CA software programs corresponding to the revoke list are not provided with the CA software program necessary for the viewer of the program and the data related CA soft ID, secret key, public key, and de-scramble key seed.

Information server 2006 is a server for accumulating home page information. As described above, television receiver 2003 is connected to information server 2006 via cable network 2004 in such manner as to enable communication. Television receiver 2003 gains access to information server 2006 via cable network 2004 to obtain home page information from information server 2006. Television receiver 2003 uses a browser to process the home page information obtained from information server 2006, and the information is superposed on the television picture or displayed together with the television picture on the television screen. Television receiver 2003 is able to transmit package information such as for reporting the ID of a software program to information server 2006. The information server is able to provide the user of television receiver 2003 with services using the package information.

Television receiver 2003 in normal operation displays television pictures on the television screen in accordance with the program data transmitted from IB server 2002. Also, television receiver 2003 prepares package information on the basis of package information producing contents included in the CA software program down-loaded from FDC server 2005. Thus, television receiver 2003 uses a browser to prepare a display screen recognizable by the user from the package information, and superposes it on the television picture or displays it together with the television picture on the television screen. Also, television receiver 2003 uses a browser to process the home page information obtained from information server 2006, and superposes it on the television picture or displays it together with the television picture on the television screen. Also, television receiver 2003 prepares package information on the basis of package information producing contents included in the CA software program, and transmits the packaged information to RDC server 2007 or information server 2006 in accordance with the instruction of the user. The package information stores terminal ID and CA soft ID.

RF converter 2010 is a bridge for converting the data of IB server 2002, FDC server 2005, and RDC server 2007 into signals transmitted to the channel of a specified band of cable network 2004. Double conversion is totally executed for achieving the purpose.

In the above description, FDC server 2005, RDC server 2007, IB server 2002, and RF converter 2010 are separate servers, but they are also preferable to be unified. Also, CA system data base 2009 and program data base 2001 are separate data bases, but they are also preferable to be unified. Also, television receiver 2003 obtains CA software program and related data of CA soft ID, secret key, public key, and de-scramble key seed from FRD server 2005, but instead, it is also preferable to obtain the data from IB server 2002.

Also, package information is transmitted form television receiver 2003 directly to RDC server 2007 in the example, but package information is also preferable to be once down-loaded to other terminal, for example, a portable telephone or personal computer that can be connected to cable network 2004 and indirectly transmitted to RDC server 2007 from the terminal. Also, the cable company is an example of digital television broadcasting company, and the company is also preferable a company using other media such as ground waves and planets.

Figure 13:
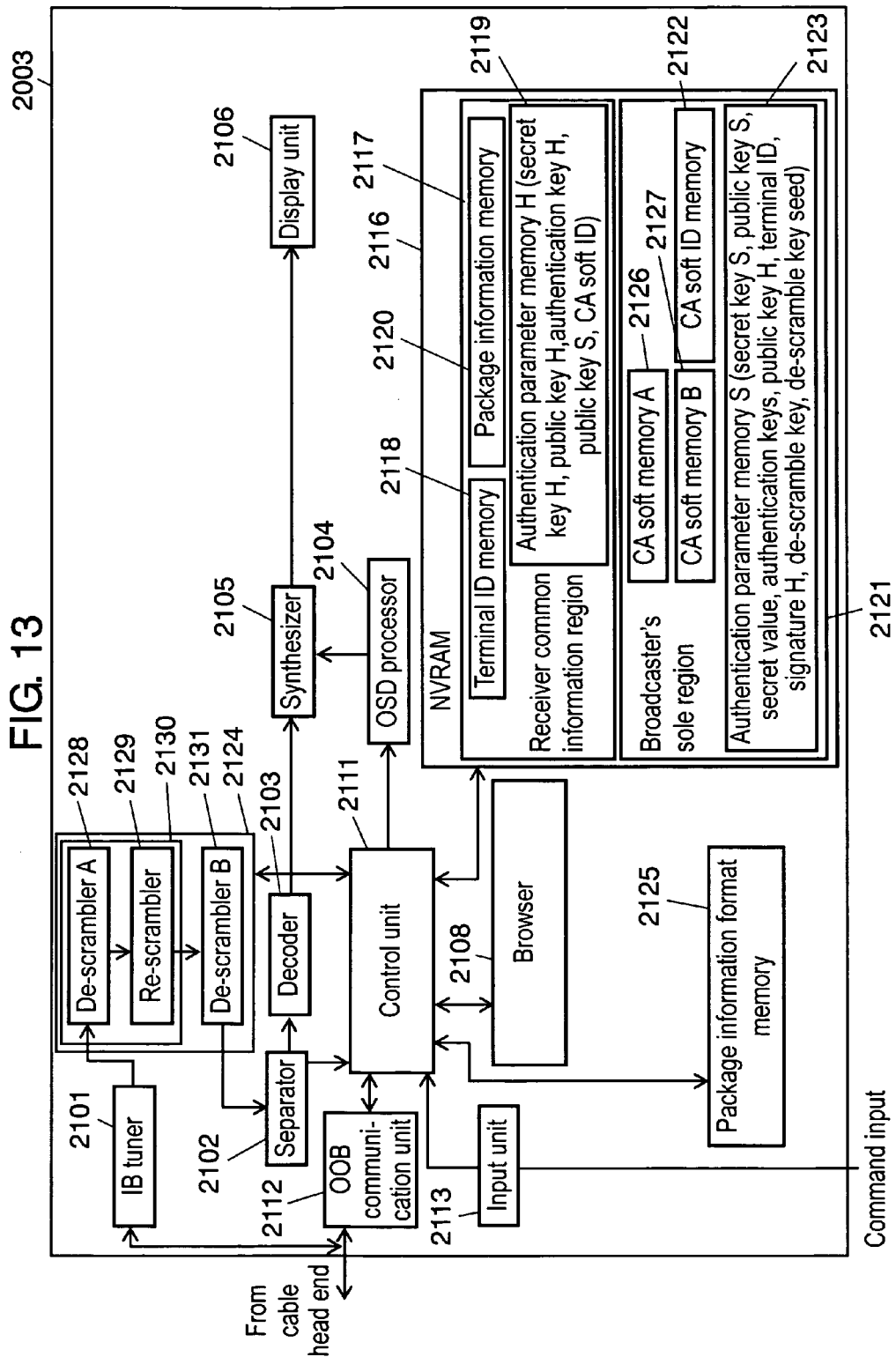
FIG. 13 is a block diagram showing the configuration of television receiver 2003 in other preferred embodiment of the present invention.

FIG. 13 is a block diagram showing the configuration of television receiver 2003 in the preferred embodiment 2 of the present invention. Television receiver 2003 comprises IB tuner 2101, separator 2102, decoder 2103, OSD (On Screen Display) processor 2104, synthesizer 2105, display unit 2106, browser 2108, control unit 2111, OOB communication unit 2112, input 2113, NVRAM 2116, receiver common information region 2117, terminal ID memory 2118, package information memory 2120, broadcaster's sole region 2121, CA soft ID memory 2122, authentication parameter memory S2123, de-scrambler 2124, package information format memory 2125, CA soft memory A2126, CA soft memory B2127, de-scrambler A2128, re-scrambler 2129, de-scramble module 2130, and de-scrambler B2131.

IB tuner 2101 extracts the signal of the frequency band selected by the user out of the program data transmitted from IB server 2002 via RF converter, and transmits the signal as a transport stream.

De-scrambler 2124 receives the transport stream from IB tuner 2101, and de-scrambles the transport stream, if scrambled, before delivering the output. De-scrambler 2124 comprises de-scramble module 2130 and de-scrambler B2131. De-scramble module 2130 comprises de-scrambler A2128 and re-scrambler 2129. The transport stream scrambled at cable head end 2011 is inputted to de-scrambler A2128 in de-scramble module 2130, where it is de-scrambled. The de-scrambled transport stream is inputted to re-scrambler 2129 in de-scramble module 2130, where it is scrambled to be used for the television receiver. The scrambled transport stream is inputted to de-scrambler B2131, where it is de-scrambled. De-scrambler 2124 obtains a key for de-scrambling or re-scrambling from control unit 2111.

Separator 2102 separates the transport stream outputted from de-scrambler 2124 into digital video signal, digital audio signal, data broadcast signal, and control signal. Decoder 2103 restores analog video signal and analog audio signal through decoding on the basis of the coded digital video signal and digital audio signal outputted from separator 2102. OSD processor 2104 outputs OSD display signal on the basis of OSD control signal outputted from control unit 2111 and drawn on a buffer memory. The buffer memory is not shown. Synthesizer 2105 synthesizes the analog video signal outputted from decoder 2103 with the OSD display signal outputted from OSD processor 2104. Display unit 2106 displays the analog video signal outputted from synthesizer 2105 on the screen. The analog audio signal outputted from decoder 2103 is outputted from the audio output. The audio output is not shown.

Control unit 2111 serves to control in various ways with respect to television receiver 2003. OOB communication unit 2112 transmits and receives various data as communication signals between FDC server 2005, information server 2006, and RDC server 2007 under the control of control unit 2111. The data include EMM data registering a report message or viewer contract, data for offering a program table, or data such as messages, CA software program down-loaded and related CA soft ID or secret key, public key, and de-scramble key seed. Input 2113 is an input unit for inputting commands from the user. Input 2113 delivers the command input signal to control unit 2111 in accordance with the command input from the user.

Browser 2108 builds up a display screen under the control of control unit 2111 in accordance with the software program received by OOB communication unit 2112 from FDC server 2005 or information server 2006. The screen is built up by setting up the characters or charts in accordance with the result of analyzing the definition file in the software program by control unit 2111. The display screen is outputted from control unit 2111 and displayed by using OSD processor 2104. Also, the browser inputs the communication signal received by OOB communication unit 2112 from information server 2006 under the control of control unit 2111 and builds up a home page screen. The screen is built up by setting up the contents included in the communication signal in accordance with the result of analyzing HTML definition file in the communication signal by control unit 2111. The home page screen is outputted from the control unit and displayed by using OSD processor 2104.

Package information format memory 2125 is a memory capable of reading and writing data under the control of control unit 2111. Package information format memory 2125 stores the format of package information. Package information format will be described later.

NVRAM 2116 is a non-volatile memory capable of reading and writing data under the control of control unit 2111. NVRAM 2116 is partitioned into receiver common information region 2117 and broadcaster's sole region 2121. Receiver common information region 2117 is a region freely accessible for the application software installed in television receiver 2003. It is possible for the application software to use the data stored in receiver common information region 2117. Broadcaster's sole region 2121 is a sole region accessible only for the software program certified by the cable company. It is inhibited for the application software to directly use the data stored in broadcaster's sole region 2121.

Receiver common information region 2117 is a region kept in NVRAM 2116 freely accessible for the application software installed in television receiver 2003. Terminal ID memory 2118 stores inherent terminal ID of television receiver 2003. As terminal ID, for example, a case of using serial numbers in the manufacture of equipment can be considered. Authentication parameter memory H2119 is a region for storing parameters necessary for the software program of television receiver 2003 in mutual authentication between CA software program and television receiver 2003. Signatures and certificates coded by a public key coding method are used for authentication. The parameter region stores, for example, inherent secret key H of television receiver 2003, public key H corresponding thereto, authentication key H produced after authentication, public key S corresponding to inherent secret key of CA software program, and CA soft ID that is the inherent ID of CA software program. Package information memory 2120 stores package information produced by CA software program. The package information is a package that stores the message for reporting the terminal ID and ID of software program or the certificate of CA software program or the signature of CA software program or de-scramble key for de-scrambling. It can be considered that secret key H, public key H, and terminal ID are stored by the maker when television receiver 2003 is delivered. Public key S and CA soft ID are obtained from the package information produced by controlling the CA software program. Authentication key H is produced and written by the terminal software program.

The application installed in television receiver 2003 is unable to freely gain access to broadcaster's sole region 2121. Only the software program certified by the cable company is able to gain access to broadcaster's sole region 2121. The software program certified by the cable company is accessible to broadcaster's sole region 2121. CA soft ID memory 2122 stores inherent CA soft ID of CA software program. As CA soft ID, for example, a case of using the version number and serial number of CA soft can be considered. CA soft ID is inherent information of the cable company. CA soft memory A2126 stores a software program for down-loading the CA software program. The software program is certified by the cable company, and it can be considered that the program is previously stored in NVRAM by the cable company. CA soft memory B2127 stores CA software program to be down-loaded. CA soft memory B2127 controls only the down-loading software program stored in CA soft memory A2126 in order to over-write the program. The software program over-written in CA soft memory B2127 is CA software program down-loaded by the software program stored in CA soft memory A2126. Authentication parameter memory S2123 is a region for storing the parameter necessary for the CA software program in mutual authentication between CA software program and television receiver 2003. The parameter here includes inherent information of the cable company. A signature or certificate coded by the public key coding method is used for the authentication. Stored in the parameter region are, for example, inherent secret key S of CA software program, public key S corresponding thereto, secret value produced from a function like hash value, authentication key S produced after authentication, inherent terminal ID of television receiver 2003, public key H corresponding to inherent secret key H of television receiver 2003, de-scramble key for de-scrambling, and de-scramble key seed for the de-scramble key. It can be considered that the secret key S, public key S, CA soft ID, and de-scramble key seed are down-loaded from cable head end 2011. These pieces of information are inherent information of the cable company. The parameter over-written in authentication parameter memory S2123 is inherent information of the cable company which is down-loaded from the software program stored in CA soft memory A2126. Secret key H and public key H are obtained from receiver common information region 2117 by controlling the CA software program. Authentication key S and secret S are produced and written by the CA software program.

In television receiver 2003, when a screen other than the television picture is displayed on the television screen, control unit 2111 produces OSD control signal for producing a screen other than the television picture, and outputs the produced OSD control signal to OSD processor 2104. Thus, a screen based on the software program down-loaded, a home page screen, or a command input screen is superposed on the television picture or displayed together with the television picture on the television screen.

In the above description, television receiver 2003 comprises receiver common information region 2117 and broadcaster's sole region 2121 in common NVRAM 2116, and the region is partitioned, but it is also preferable to comprise them as separate devices. Further, it is preferable to comprise only CA soft memory A2126 as a device other than the broadcaster's sole region. In that case, it can be considered that NVRAM device which stores a software program for down-loading the CA software program certified by the cable company is provided by the cable company. Also, it can be considered that various parameters stored in broadcaster's sole region 2121 are coded as specified. In that case, the CA software program probably includes a software program for coding.

Also, package information is transmitted outside the television receiver 2003 by using OOB communication unit 2112, but it is also preferable that control unit 2111 comprises an interface of storage medium such as a memory card capable of writing and reading package information in order to output the information through the storage medium.

Also, de-scrambler 2124 comprises de-scramble module 2130 and de-scrambler B2131 in the description, but it is also preferable that de-scramble module 2130 and de-scrambler B2131 are not integral but separate devices. Also, it can be considered that re-scrambler 2129 and de-scrambler B2131 are omitted and only de-scrambler A2128 is included in the configuration.

Figure 14:
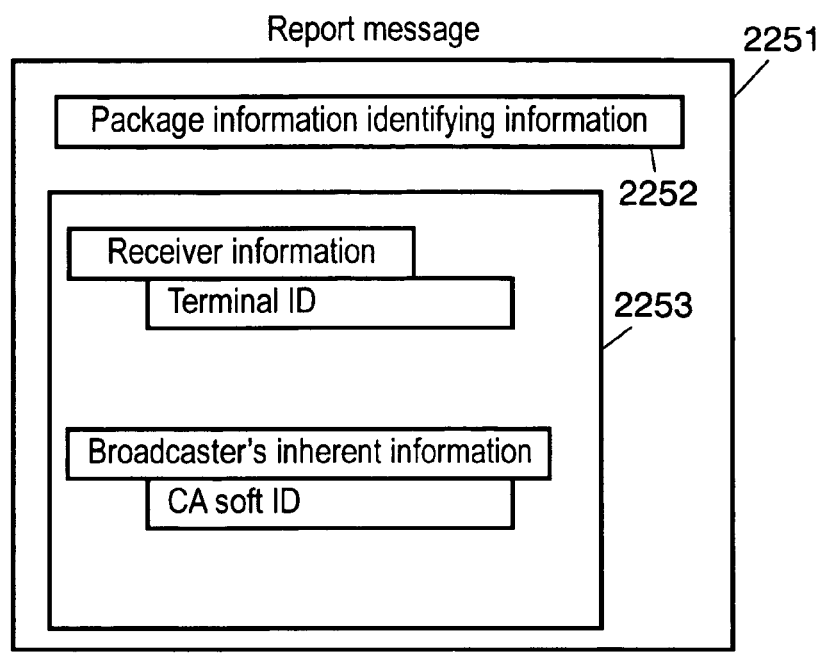
FIG. 14, FIG. 15, FIG. 16, FIG. 17 show package information stored in a package information memory.

FIG. 14, FIG. 15, FIG. 16, and FIG. 17 show package information stored in package information memory 2120. Package information 2251 in FIG. 14 is information usable as a report message. Package information basic unit 2253 comprises terminal ID that is the common information of the television receiver and CA soft ID that is the inherent information of the cable company. These pieces of information are preferable to be coded and packaged. Package information header 2252 stores information showing that package information 2251 is package information usable as report message.

Figure 15:
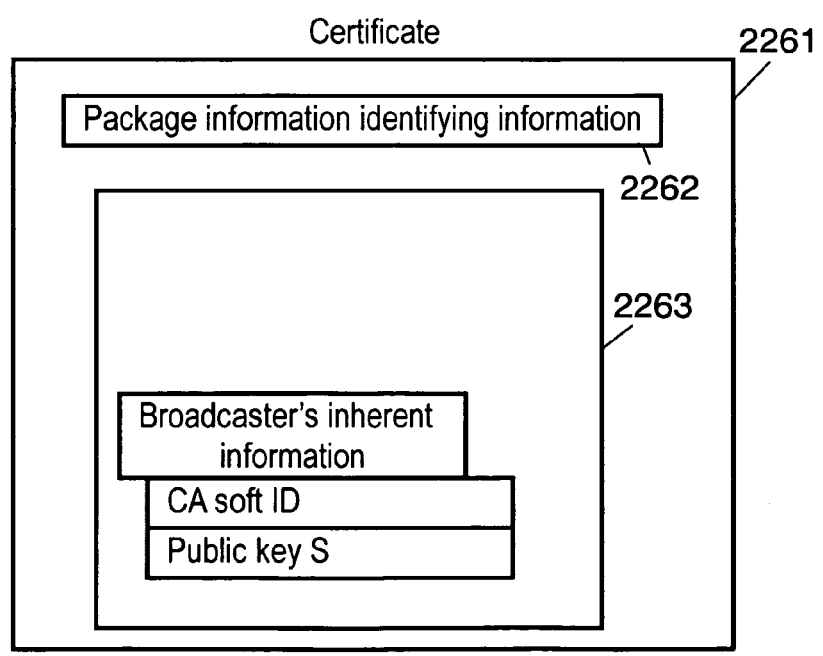

Package information 2261 in FIG. 15 is information usable as certificate. Package information basic unit 2263 comprises CA soft ID, inherent information of the cable company, and public key S. Public key S is preferable to be secret key S. These pieces of information are preferable to be coded and packaged. Package information header 2262 stores information showing that package information 2261 is package information usable as certificate.

Figure 16:
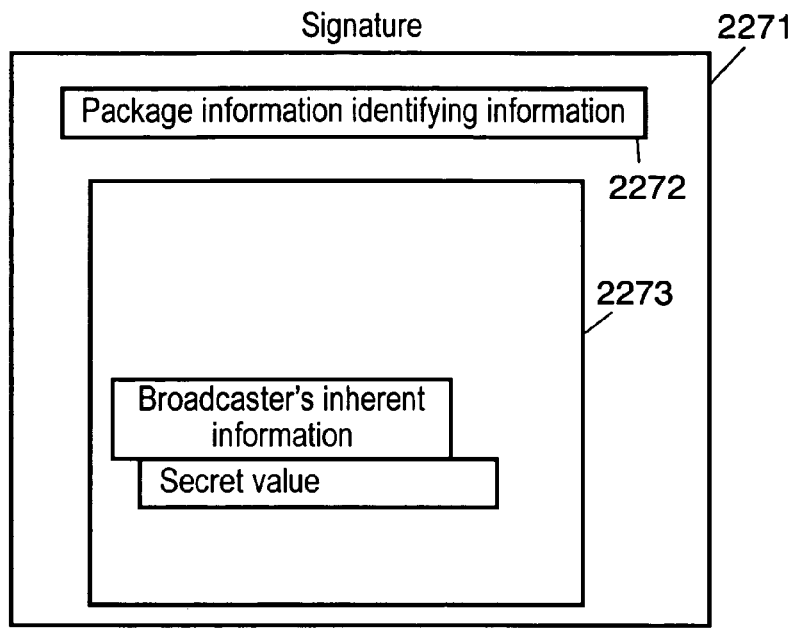

Package information 2271 in FIG. 16 is information usable as signature. Package information basic unit 2273 comprises secret value that is inherent information of the cable company. The secret value is a numeric value calculated by a specific function like a hash value, and it is difficult to obtain the original value from the result of calculation or to tamper with the value to obtain same value. It can be considered that the function is included in CA software program. The secret value is re-calculated on the basis of random numbers each time the package information usable as signature is produced, and the values used are different. The secret value is coded by public key H and stored. Package information header 2272 stores information showing that package information 2271 is package information usable as signature.

Figure 17:
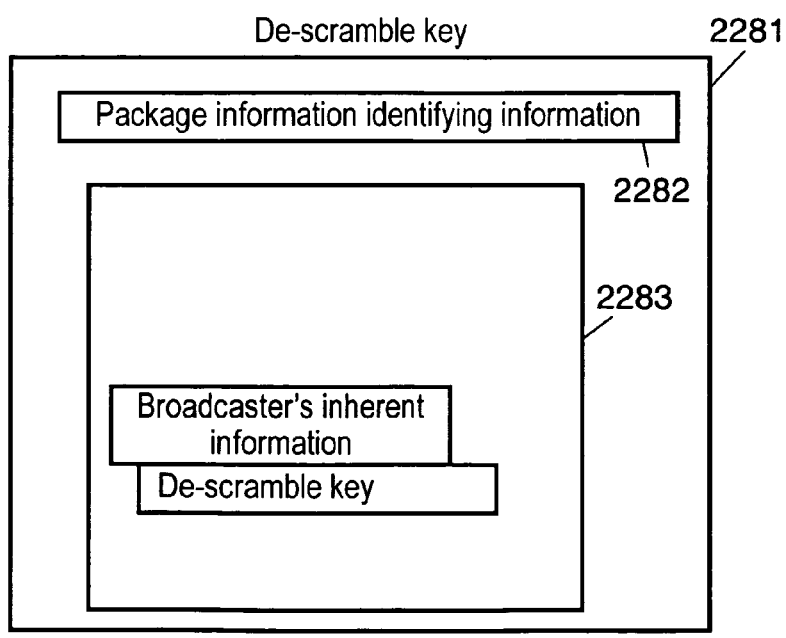

Package information 2281 in FIG. 17 is information usable as a de-scramble key. Package information basic unit 2283 comprises a de-scramble key that is inherent information of the cable company. The information is preferable to be coded and packaged. Package information header 2282 stores information showing that package information 2281 is package information usable as de-scramble key.

The package information format and coding system described above are pre-determined in the digital broadcasting system shown in FIG. 12, and the package information can be identified and coded in the digital broadcasting system. In television receiver 2003, the package information format and coding system are stored in package information format memory 2125. The package information format is preferable to be such that the information is previously stored in package information format memory 2125 before delivery, written by down-loading the software program after delivery, or written by package information producing contents. Package information is produced by the package information producing contents. It can be easily considered that the package information is stored in the data region of communication packet conforming to various communication protocols.

Figure 18:
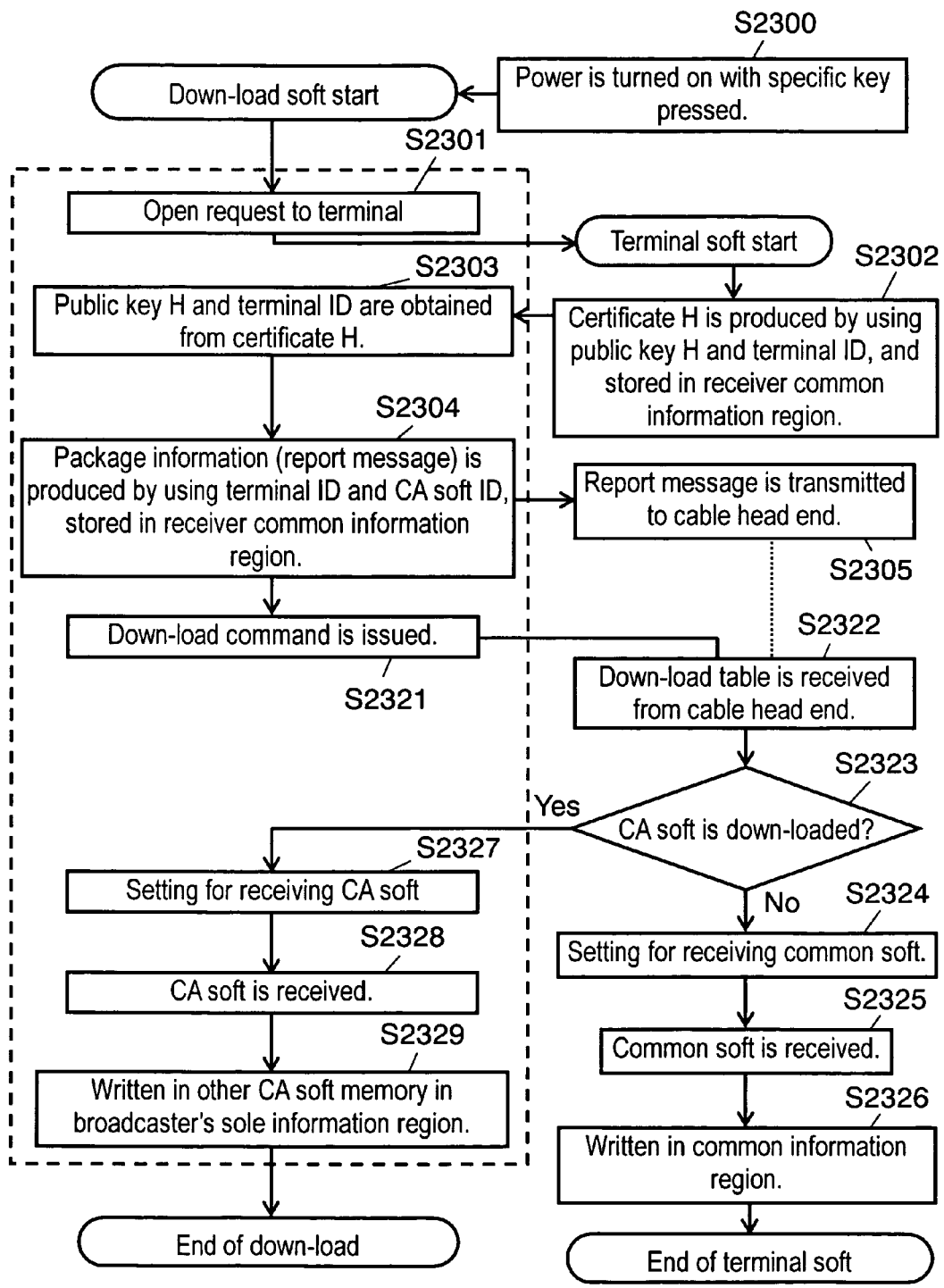
FIG. 18 is the first flow chart showing a process of producing and storing package information in other preferred embodiment of the present invention.

FIG. 18 is the first flow chart showing a process of producing and storing package information usable as report message by television receiver 2003 in the preferred embodiment 2 of the present invention. Control unit 2111 of television receiver 2003 executes the following process when detected that the user has turned on the power while pushing a specific key by using input 2113 (step S2300). When the user purchases television receiver 2003 and concludes a viewer contract for services or contents offered by the cable company or when the user receives an instruction for renewing the CA software program from the cable company, the user performs the operation of step S2300 for down-loading the CA software program to television receiver 2003.

Control unit 2111 serves to load the down-load software program for down-loading the CA software program stored in CA soft memory A2126. It is possible to gain access to CA soft memory A2126 only with an instruction for renewing the CA software program received, for example, when the operation of step S2300 is performed or the de-scramble key is changed from the cable company. It can be considered for the method that the address issue of control unit 2111 is limited by the software program or hardware depending upon the conditions. In the case of software program, it can be considered that software programs enabling the access to CA soft memory A2126 are classified to set the privilege level higher. In the case of hardware, it can be considered that only when a specific key is pressed in step S2300, it makes the address effective for gaining access to CA soft memory A2126.

Described next is the control by software program for down-loading. The portion shown by dotted line in FIG. 18 is the control by software program for down-loading. Also, the control at the right-hand side is control by terminal software program that is a software program installed in television receiver 2003. The terminal software program here is provided in television receiver 1100, and it can be considered that the program is stored in control unit 2111. Control unit 2111 is mounted with OS capable of multi-task processing and it is possible to execute the process while changing over the software program for down-loading and the terminal software program.

Control unit 2111 first controls the software program for down-loading to issue an open request to the terminal software program, requesting it to start down-loading (step S2301). With the open request detected, control unit 2111 controls the terminal software program to read public key H and terminal ID stored in receiver common information region 2117. In this way, control unit 2111 uses the information to produce certificate H and stores it in receiver common information region 2117 (step S2302). The information of public key H and terminal ID is preferable to be coded and turned into certificate H.

Control unit 2111 controls the software program for down-loading in order to read and obtain certificate H stored in step S2302 (step S2303). Control unit 2111 controls the software program for down-loading in order to decode the certificate H and to ascertain the truth. When the truth is ascertained, control unit 2111 produces package information usable as report message by using terminal ID obtained in step S2303 and CA soft ID stored in broadcaster's sole region 2121, and stores the information in receiver common information region 2117 (step S2304). In this case, as CA soft ID, it can be considered that ID showing a down-load soft is previously stored, or the data shows that the CA software program is not down-loaded. The information of terminal ID and CA soft ID is preferable to be coded and packaged.

Control unit 2111 controls the terminal software program in order to produce message information of communication packet type which can be transmitted to RDC server 2007 at cable head end 2011 by using the package information produced in step S2304. And, control unit 2111 controls OOB communication unit 2112 to transmit the information to RDC server 2007 (step S2305). The control in step S2305 is not always required to be executed immediately after step S2304. The package information produced in step S2304 is stored in NVRAM 1116. Accordingly, the terminal software program is able to read and use the package information as needed. Also, the package information is preferable to be transmitted not only to RDC server 2007 but also to information server 2006. As a result, it is possible even for a company other than the cable company to provide the user of television receiver 1100 with a service of using package information.

Control unit 2111 controls the software program for down-loading in order to issue a down-load command requesting the down-load process of CA software program to the terminal software program (step S2321).

Cable head end 2011 digests the message information received in step S2305 and identifies the terminal ID and CA soft ID. The pair of identified terminal ID and CA soft ID is transmitted from RDC server 2007 to CA system data base 2009. CA system data base 2009 collates the pair of received terminal ID and CA soft ID with the revoke list. If the received terminal ID and CA soft ID do not coincide with the terminal ID and CA soft ID registered in the revoke list, CA system data base 2009 will permit the down-load of CA software program, and if they coincide with each other, the data base will not permit the down-load thereof When permitted, CA software program to be down-loaded, CA soft ID, secret key S, public key S, and de-scramble key seed corresponding to the CA software program to be down-loaded are transmitted from FDC server 2005. CA system data base 2009 manages and accumulates terminal ID and CA soft ID, secret key S, public key S, and de-scramble key seed correspondingly in the data base. FDC server 2005 converts the CA soft ID, secret key S, public key S, de-scramble key seed, and CA software program into a type of information that can be down-loaded by television receiver 2003, and transmits the information to television receiver 2003. FDC server 2005 further produces a down-load table storing the information to be down-loaded in advance and transmits it to television receiver 2003. The down-load table includes information such as communication route, modulation system, down-load packet ID, and type of software program to be down-loaded.

The terminal software program receiving a down-load command in step S2321 is in a standby mode for receiving a down-load table. Control unit 2111 digests the down-load table when OOB communication unit 2112 receives a down-load table from FDC server 2005 (step S2322). Control unit 2111 identifies the communication route, modulation system, and down-load packet ID and sets OOB communication unit 2112 and makes the preparation for receiving the down-load packet. Also, control unit 2111 identifies the type of software program and checks whether the software program to be down-loaded is CA software program or not (step S2323).

When the software program is not a CA software program, control unit 2111 controls the terminal software program in order to make the setting for receiving a common software program (step S2324), and receives the common software program (step S2325). After that, control unit 2111 stores the received common software program in the empty region of receiver common information region 2117 (step S2326). When the software program is a CA software program, the terminal software program transfers the reception control to a software program for down-loading. Control unit 2111 controls the software program for down-loading in order to make the setting for receiving CA software program (step S2327) to receive the CA software program (step S2328). After that, control unit 2111 stores the received CA software program in CA soft memory B2127 that is a region different from the region where the software program for down-loading of broadcaster's exclusive information region 2121 is stored. Also, authentication parameters are also received together with CA software program and stored in authentication parameter memory S2123 in broadcaster's exclusive information region 2121. The received and stored authentication parameters are secret key S, public key S, and de-scramble key seed. Also, CA soft ID is also received together with CA software program and stored in CA soft ID memory 2122 in broadcaster's exclusive information region 2121 (step S2329). Here, the purpose of storing the CA software program in a region different from the region where the CA software program for down-loading is stored is to maintain the software program for down-loading so that doing it over again is enabled even in case of down-load failure. For the de-scramble key seed, it is also possible to receive and renew by using EMM separately transmitted from FDC server 2005.

As described above, television receiver 2003 is able to transmit a report message using CA soft ID stored in the broadcaster's sole region of NVRAM and terminal ID stored in the common information region to the broadcaster, controlling the software program for down-loading certified by the broadcaster. Furthermore, television receiver 2003, controlling the software down-loaded from the broadcaster, is able to store the CA software program down-loaded from the broadcaster in the broadcaster's sole region of NVRAM.

Figure 19:
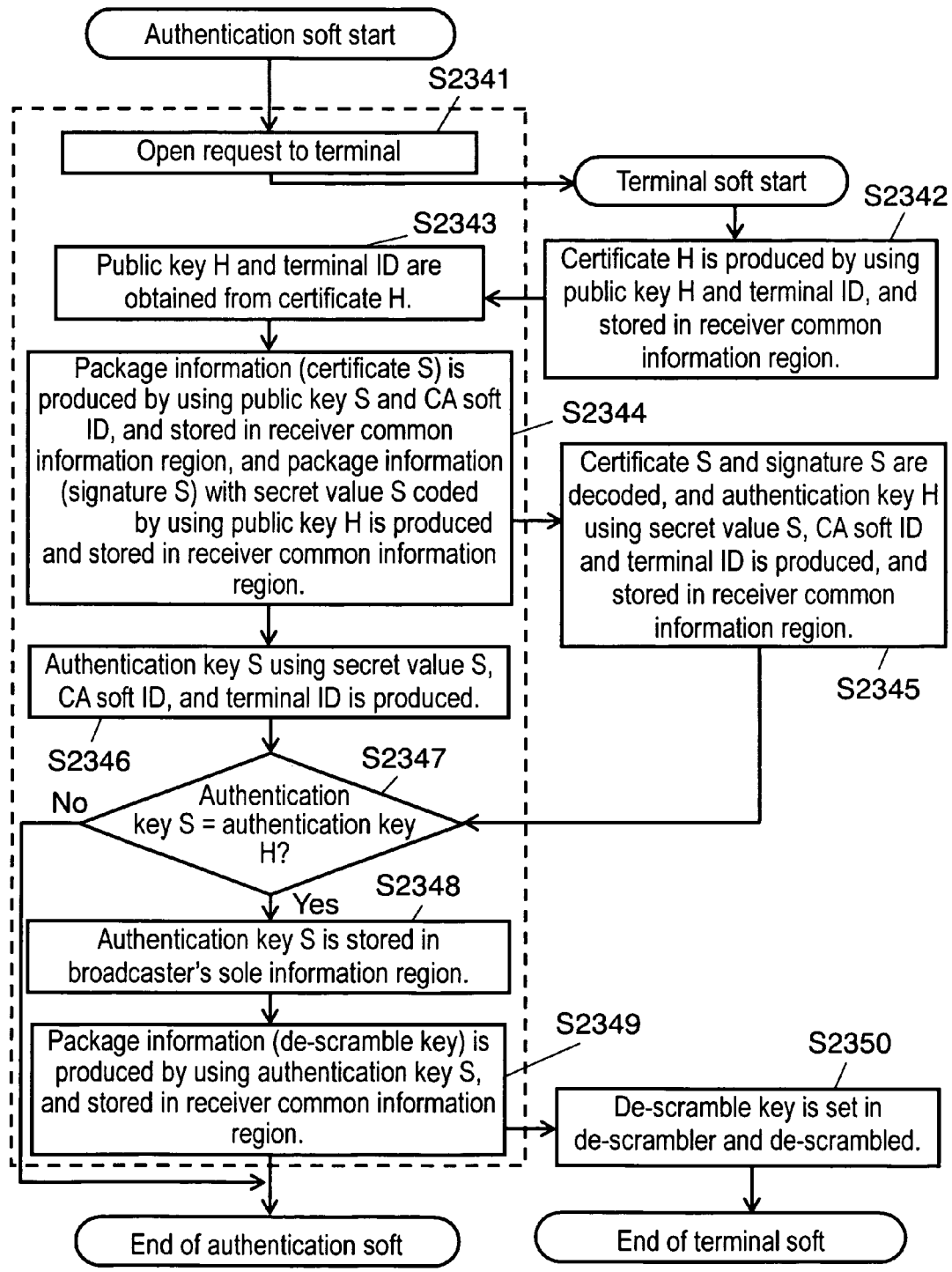
FIG. 19 is the second flow chart showing a process of producing and storing package information in other preferred embodiment of the present invention.

FIG. 19 is the second flow chart showing the process of producing and storing package information in the preferred embodiment 2 of the present invention. The package information includes package information usable as certificate used for certifying the CA software program by television receiver 2003 and the CA function by television receiver 2003, and package information usable as signature. Control unit 2111 of television receiver 2003 execute the following process after completion of down-loading the CA software program described by using FIG. 18 or for the purpose of renewing the de-scramble key.

Control unit 2111 loads the CA software program stored in CA soft memory B2127. It is possible to gain access to CA soft memory B2127 only for certifying the CA software program and the CA function by television receiver 2003. In the method, it can be considered that the address issue of control unit 2111 is limited by the software program or hardware program depending upon the conditions.

The control by CA software program is described in the following. The portion shown by dotted line in FIG. 19 is the control by CA software program. Also, the control at the right-hand side shows the control by terminal software program that is the software program installed in television receiver 2003. The terminal software program is installed in television receiver 1110, and it is probably stored in control unit 2111. In control unit 2111, since OS capable of multi-task processing is installed, it is possible to execute the process while changing over the CA software program and terminal software program.

Control unit 2111 first controls the CA software program in order to issue an open request to the terminal software program, requesting it to start the authentication process (step S2341). When the open request is detected, control unit 2111 controls the terminal software program in order to read public key H and terminal ID stored in receiver common information region 2117, and uses the information to produce certificate H and stores it in receiver common information region 2117 (step S2342). The information of public key H and terminal ID is preferable to be coded and turned into certificate H.

Control unit 2111 controls the CA software program in order to read and obtain certificate H stored in step S2342 (step S2343).

Control unit 2111 controls the CA software program in order to decode certificate H and to ascertain the truth. When the truth is ascertained, control unit 2111 produces package information usable as certificate by using public key S and CA soft ID stored in broadcaster's sole region 2121, and stores the information in receiver common information region 2117. The information of public key S and CA soft ID is preferable to be coded and packaged. Also, control unit 2111 controls the CA software program in order to calculate secret value S by using the function included in the CA software program on the basis of random numbers generated. Control unit 2111 serves to code the calculated secret value S by using public key H obtained in step S2343 and produces package information usable as signature and stores it in receiver common information region 2117 (step S2344). Secret value S is re-calculated each time the package information usable as signature is produced, and the values used are different.

Control unit 2111 controls the terminal software program in order to read the package information usable as signature stored in receiver common information region 2117, and decodes it by using secret key H stored in receiver common information region 2117 in order to obtain secret value S. Also, control unit 2111 reads the package information usable as certificate stored in receiver common information region 2117 in order to obtain CA soft ID. Further, control unit 2111 uses the terminal ID stored in receiver common information region 2117, secret value S obtained, and CA software in order to execute the specified coding to produce authentication key H, and stores it in receiver common information region 2117 (step S2345). The control in step S2345 is not always required to be executed immediately after step S2344. The package information produced in step S2344 is stored in NVRAM 1116. Accordingly, it is possible for the terminal software program to read and use the package information as needed. Also, the package information is preferable to be transmitted to information server 2006 by using OOB communication unit 2112. Thus, it is possible for a company other than the cable company to provide the user of television receiver 1100 with a service of using the package information.

Control unit 2111 controls the CA software program in order to produce authentication key S by using secret value S produced in step S2344, terminal ID obtained in step 2343, and CA soft ID stored in broadcaster's sole region 2121 and executing the specified coding (step S2346).

Control unit 2111 controls the CA software program in order to check whether the authentication key S produced in step S2346 coincides with the authentication key H stored in broadcaster's sole region 2121 (step S2347).

When they are coincident with each other, control unit 2111 controls the CA software program in order to store authentication key S in broadcaster's sole region 2121 (step S2348). And, control unit 2111 produces de-scramble key using authentication key S or de-scramble key using de-scramble key seed to produce package information usable as de-scramble key, and store it in receiver common information region 2117 (step S2349). The information of de-scramble key is preferable to be coded and packaged.

Control unit 2111 controls the terminal software program in order to read package information usable as de-scramble key stored in receiver common information region 2117 and decodes the de-scramble key to set it in de-scrambler 2124. Thus, even in case the transport stream is scrambled, de-scrambler 2124 is able to scramble by using the de-scramble key. The de-scramble key using de-scramble key seed is set in de-scrambler A2128, and the de-scramble key using authentication key S is set in de-scrambler B2131. The scramble key produced by using authentication key H is set in re-scrambler 2129 (step S2350).

As described above, television receiver 2003 is able to produce authentication key S by using CA soft ID and secret value S stored in the broadcaster's sole region of NVRAM and terminal ID stored in the common information region, controlling the CA software program certified by the broadcaster. Accordingly, it is possible to produce de-scramble key that varies with authentication. Also, television receiver 2003 controls the CA software program certified by the broadcaster in order to set the de-scramble key in the de-scrambler by using package information according to authentication key S or de-scramble key seed stored in the broadcaster's sole region of NVRAM. Thus, it is possible to de-scramble the scrambled transport stream received from the broadcaster.

Figure 20:
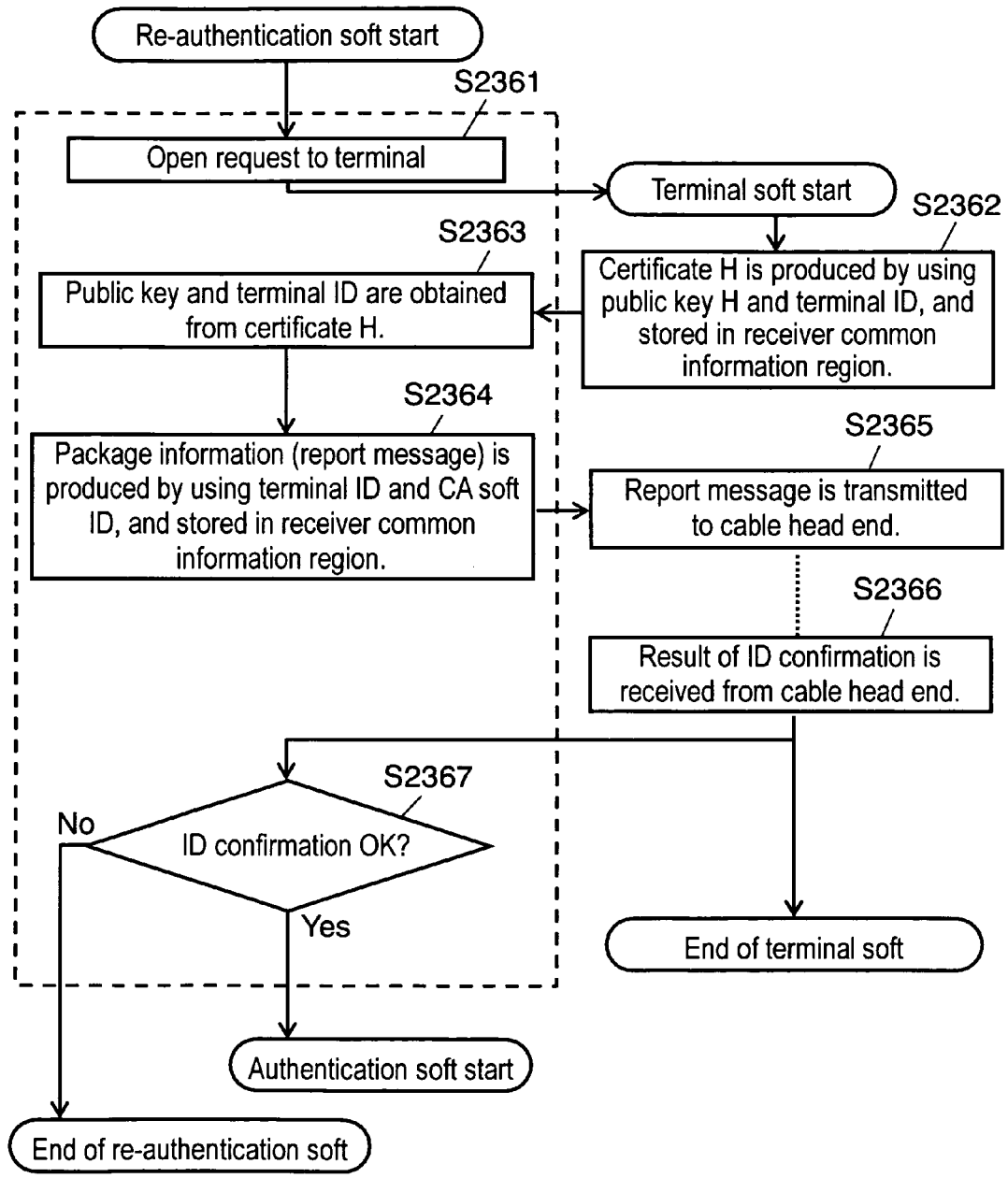
FIG. 20 is the third flow chart showing a process of producing and storing package information in other preferred embodiment of the present invention.

FIG. 20 is the third flow chart showing the process of producing and storing package information usable as report message by television receiver 2003 in the preferred embodiment 2 of the present invention. Control unit 2111 of television receiver 2003 executes the following process for sending the report message to cable head end 2011 in the case of re-authentication or renewing the de-scramble key.

Control unit 2111 loads the CA software program for producing the report message stored in CA soft memory B2127. It is possible to gain access to CA soft memory B2127 only when producing the report message in the case of re-authentication or renewing the de-scramble key. It can be considered for the method that the address issue of control unit 2111 is limited by the software program or hardware depending upon the conditions.

The control by CA software program is described in the following. The portion shown by dotted line in FIG. 20 is the control by CA software program. Also, the control at the right-hand side shows the control by terminal software program that is the software program installed in television receiver 2003. The terminal software program is installed in television receiver 1110, and it is probably stored in control unit 2111. In control unit 2111, since OS capable of multi-task processing is installed, it is possible to execute the process while changing over the CA software program and terminal software program.

Control unit 2111 first controls the CA software program in order to issue an open request to the terminal software program, requesting it to start the re-authentication process (step S2361). When the open request is detected, control unit 2111 controls the terminal software program in order to read public key H and terminal ID stored in receiver common information region 2117, and uses the information to produce certificate H and stores it in receiver common information region 2117 (step S2362). The information of public key H and terminal ID is preferable to be coded and turned into certificate H.

Control unit 2111 controls the CA software program in order to read and obtain certificate H stored in step S2362 (step S2363). Control unit 2111 controls the CA software program in order to decode certificate H and to ascertain the truth. When the truth is ascertained, control unit 2111 produces package information usable as report message by using terminal ID obtained in step S2363 and CA soft ID stored in broadcaster's sole region 2121, and stores the information in receiver common information region 2117 (step S2364). The information of terminal ID and CA soft ID is preferable to be coded and packaged.

Control unit 2111 controls the CA software program in order to produce message information of communication packet type that can be transmitted to RDC server 2007 at cable head end 2011 by using the package information produced in step S2364, and controls OOB communication unit 2112 in order to transmit RDC server 2007 (step S2365). The control in step S2365 is not always required to be executed immediately after step S2364. The package information produced in step S2364 is stored in NVRAM 1116. Accordingly, the terminal software program is able to read and use the package information as needed. Also, the package information is preferable to be transmitted not only to RDC server 2007 but also to information server 2006. Thus, it is possible even for a company other than the cable company to provide the user of television receiver 1100 with a service of using the package information.

Cable head end 2011 digests the message information received in step S2365 and identifies the information of terminal ID and CA soft ID. The pair of identified terminal ID and AC soft ID is transmitted from RDC server 2007 to CA system data base 2009. CA system data base 2009 collates the pair of received terminal ID and CA soft ID with the revoke list. If the received terminal ID and CA soft ID do not coincide with the terminal ID and CA soft ID registered in the revoke list, CA system data base 2009 will permit the re-authentication, and if they coincide with each other, the data base will not permit the re-authentication. When permitted, FDC server 2005 will transmit an ID confirmation completion message to television receiver 2003.

The terminal software program that has transmitted the report message in step S2365 is in a standby mode for receiving the ID confirmation completion message. When OOB communication unit 2112 receives the ID confirmation completion message from FDC server 2005, control unit 2111 serves to deliver the ID confirmation completion message to the CA software program (step S2366).

Control unit 2111 controls the CA software program in order to digest the ID confirmation completion message. The content of the message is identified and checked whether the ID confirmation is completed or not (step S2367).

In case the ID confirmation is completed, control unit 2111 loads the authentication soft described in FIG. 19 and performs the authentication control again. If it is performed again, the secret value S will change, and therefore, it is possible to certify the CA software program and the CA function of television receiver 2003 with a parameter different from the previous one and to produce new authentication key. As a result, the de-scramble key can be renewed. If the ID confirmation is not completed, the de-scramble key cannot be renewed.

As described above, television receiver 2003 controls the CA software program certified by the broadcaster and, thereby, it is able to transmit the report message using CA soft ID stored in the broadcaster's sole region of NVRAM and terminal ID stored in the common region to the broadcaster. At the cable head end, a television receiver making illegal copies is limited in renewing the de-scramble key, and it can be revoked. Further, television receiver 2003 controls the CA software program certified by the broadcaster and, thereby, it is able to certify the CA software program down-loaded from the broadcaster and television receiver 2003.

Figure 21:
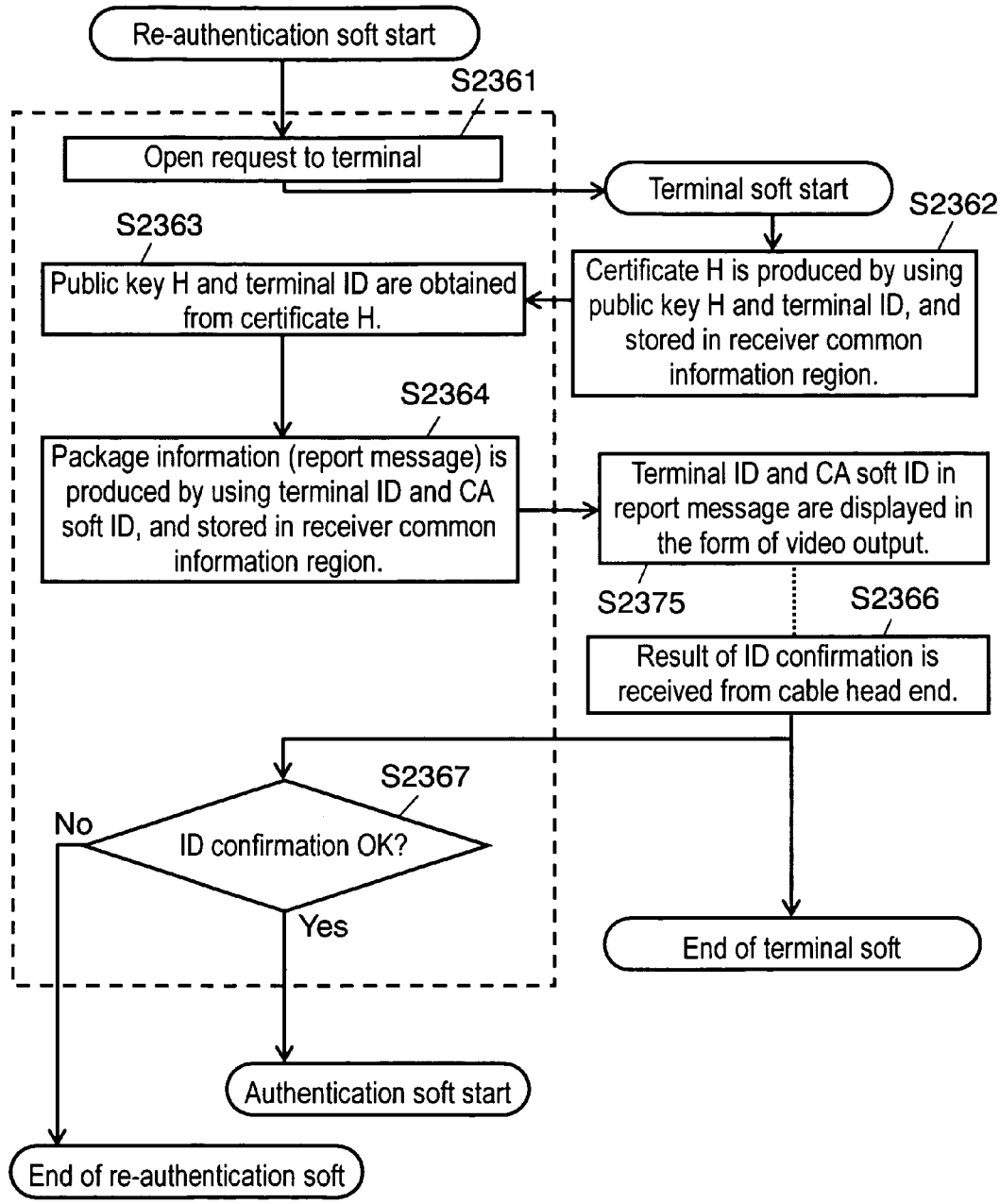
FIG. 21 is the fourth flow chart showing a process of producing and storing package information in other preferred embodiment of the present invention.

FIG. 21 is the fourth flow chart showing the process of producing and storing package information usable as report message by television receiver 2003 in the preferred embodiment 2 of the present invention. It is an example of modification of the control shown in FIG. 20.

Only control different from the control shown in FIG. 20 will be described. After step S2364, control unit 2111 controls the terminal software program to display terminal ID and CA soft ID in the form of video output by using package information produced in step S2364 (step S2375). Control unit 2111 controls browser 2108, OSD processor 2104, synthesizer 2105, and display unit 2106 in order to display terminal ID and CA soft ID. The control in step S2375 is not always required to be executed immediately after step S2364. Package information produced in step S2364 is stored in NVRAM 1116. Accordingly, the terminal software program can be used by reading the package information as needed. An example of display screen is described in the following by using FIG. 22.

Figure 22:
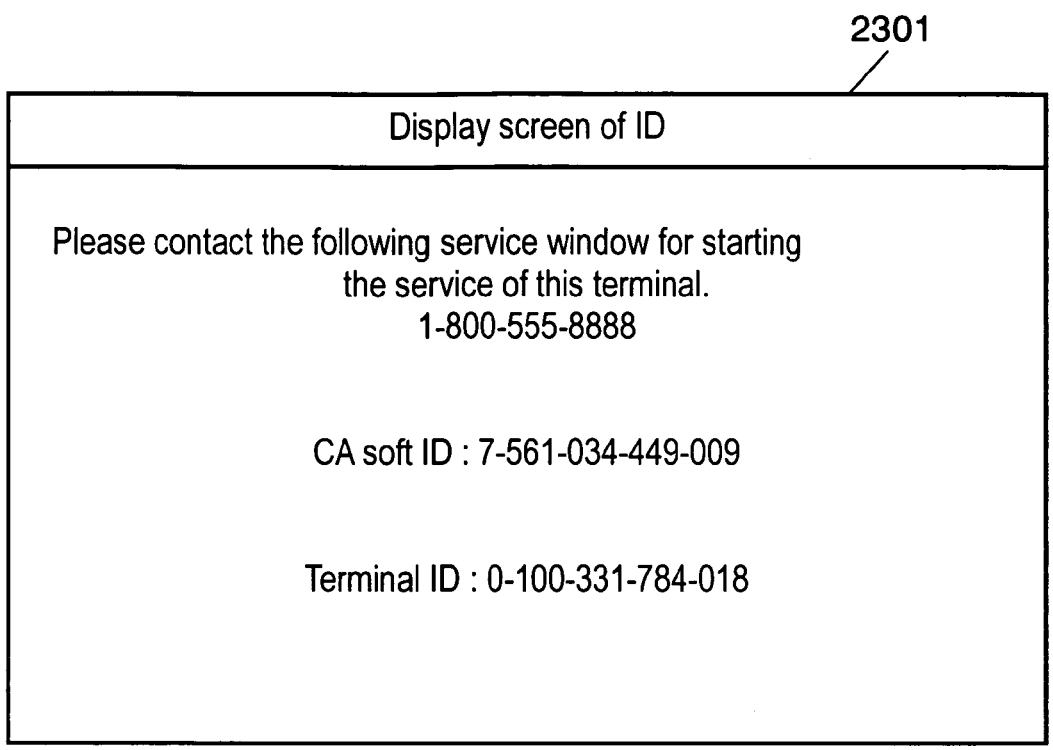
FIG. 22 shows a screen for presenting terminal ID and CA soft ID.

FIG. 22 is a screen showing the terminal ID and CA soft ID. The address for the user to connect the terminal ID and CA soft ID thereto, terminal ID and CA soft ID are shown on the screen. The user viewing the screen shown in step S2375 connects the terminal ID and CA soft ID to the address displayed on the screen. The terminal ID and CA soft ID are connected to cable head end 2011 from the address. Then, CA system data base 2009 identifies the information of terminal ID and CA soft ID, and collates the pair of terminal ID and CA soft ID with the revoke list. If they do not coincide with the terminal ID and CA soft ID registered in the revoke list, CA system data base 2009 will permit the re-authentication, and if they coincide with each other, the data base will not permit the re-authentication. When permitted, FDC server 2005 transmits an ID confirmation completion message to television receiver 2003. The control thereafter is same as the control shown in FIG. 19, and the description is omitted.

As described above, television receiver 2003 controls the CA software program certified by the broadcaster and, thereby, it is able to provide the user with CA soft ID stored in the broadcaster's sole region of NVRAM and terminal ID stored in the common region. Thus, the user is able to connect the terminal ID and CA soft ID to the cable head end. At the cable head end, a television receiver making illegal copies is limited in renewing the de-scramble key, and it can be revoked. Further, television receiver 2003 controls the CA software program certified by the broadcaster and, thereby, it is able to certify the CA software program down-loaded from the broadcaster and television receiver 2003.

As described above, the television receiver in the preferred embodiment 2 of the present invention comprises: a receiving means for receiving broadcaster's inherent CA soft ID or CA software program for requesting package information that can be handled as common information by using authentication parameter, and company's inherent CA soft ID or authentication parameter; a broadcaster's exclusive information memory means having a broadcaster's sole region for storing broadcaster's inherent CA soft ID or authentication parameter and the CA software program; a common information memory means for storing common information freely accessible for applications in the television receiver; and a control unit which obtains package information by using CA software program and stores it in the common information memory means for controlling so that the application in the television receiver may use the package information.

Also, the digital broadcasting system in the preferred embodiment 2 of the present invention comprises a first information server for broadcasting CA software program for obtaining package information that can be handled as common information by using broadcaster's inherent CA soft ID or authentication parameter, and broadcaster's inherent CA soft ID or authentication parameter in a digital fashion; a television receiver for receiving broadcaster's inherent CA soft ID and CA software program for obtaining package information that can be handled as common information by using the broadcaster's inherent CA soft ID or authentication parameter for certifying the CA software program and television receiver and also to transmit the information to a second information server connected in such manner as to enable communication; a second information server which extracts ID of the CA software program and ID of the television receiver out of the package information and transmits the IDs to a data base managed by the broadcaster in a digital fashion; and the data base for collating the IDs with the revoke list.

In this way, the CA software program can be down-loaded by using only the software program certified by the broadcaster, and the CA software program to be down-loaded can be stored in the broadcaster's sole region of the television receiver. Accordingly, the software program of a television receiver is prevented from freely down-loading and gaining access to the CA software program to analyze or tamper with it, and thereby, it is possible to assure anti-tampering characteristics. Further, the information of ID or authentication parameter down-loaded to the broadcaster's sole region together with the CA software program can be turned into package information by processing the CA software program certified by the broadcaster, and the package information can be stored in the receiver common region of the television receiver. The television receiver is able to realize the authentication of the CA software program and the television receiver by controlling the CA software program. Accordingly, illegal copy terminal can be revoked, and it is possible to realize a safe system for down-loading CA software program from the broadcaster to the television receiver. As a result, CA software program can be down-loaded, and as compared with the case of providing the user with CA function in the form of security module, it brings about such advantages that the cost of security module itself is not needed and that it is not necessary for the user to spend time and money for changing the security module even in case of removal.

INDUSTRIAL APPLICABILITY

The television receiver and the digital broadcasting system of the present invention render an advantage to each of the user, broadcaster and maker and bring about an effect of accelerating the propagation of digital broadcast. Also, the television receiver and the digital broadcasting system of the present invention are useful apparatuses for receiving digital broadcasts such as a television receiver, set-top box, personal computer, and portable telephone.

The invention claimed is:

1. A television receiver for receiving a digital television broadcast comprising:
   a memory unit, the memory unit including:
   a) a broadcaster's sole region which is accessible by content transmitted by a broadcaster, the broadcaster's sole region storing broadcast points, wherein the broadcast points are provided to the television receiver based on the amount of time that content from the broadcaster which includes audio/video programming is viewed, wherein content provided from other than said broadcaster is prevented from accessing the broadcaster's sole region; and
   b) a receiver common information region which is accessible by software received from a source other than said broadcaster;
   a package information region, included in the receiver common information region, for storing package information including information from the broadcaster's sole region
   a broadcast browser for obtaining, from the digital television broadcast, said content transmitted by the broadcaster, and for using said content to retrieve the broadcast points from the broadcaster's sole region to produce the package information which includes the broadcast points and to transfer the package information to the package information region; and
   a communications browser for converting the broadcast points into a further type of value and for transmitting said further type of value to other than said broadcaster.

2. The television receiver of claim 1, wherein:
   a control unit using the content transmitted by the broadcaster for obtaining the package information by using broadcaster information and executing control for obtaining and storing the package information in the common information memory unit.

3. The television receiver of claim 2, further comprising a terminal ID memory for storing a terminal ID that is a broadcaster ID of the television receiver,
   wherein content transmitted by the broadcaster for obtaining the package information by using the broadcaster information produces the package information out of the broadcaster information and the terminal ID.

4. The television receiver of claim 2, wherein the broadcaster information includes program viewing record information.

5. The television receiver of claim 2, wherein the memory unit has a second sole region for down-loading and storing content transmitted by the broadcaster for obtaining the package information by using the broadcaster information, and the control unit executes control for down-loading and storing the broadcast points in a first sole region in the memory unit with content transmitted by the broadcaster stored in the second sole region.

6. The television receiver of claim 5, wherein content transmitted by the broadcaster for obtaining the package information by using the broadcaster information includes conditional access software, and the broadcaster information includes a conditional access software ID that is a broadcaster ID of the conditional access software.

7. The television receiver of claim 6, wherein the broadcaster information includes an authentication parameter used for the conditional access software.

8. The television receiver of claim 7, wherein the authentication parameter includes a secret key or a public key.

9. The television receiver of claim 2, further comprising:
a communication browser for receiving and displaying home page information accumulated in an information server connected in such manner as to enable communication; and
a broadcast browser which receives a data broadcast to display a data broadcast screen;
wherein a control unit uses the broadcast browser to execute control for obtaining and storing the package information in the receiver common information region and uses the communication browser to execute control for transmitting the package information to the information server.

10. The television receiver of claim 1, wherein the memory unit has a second sole region for down-loading and storing the content transmitted by the broadcaster for obtaining the package information by using broadcaster information, and a control unit executes control for down-loading and storing the broadcast points in a first sole region in the memory unit with the content transmitted by the broadcaster stored in the second sole region.

11. The television receiver of claim 10, wherein the content transmitted by the broadcaster for obtaining the package information by using the broadcaster information includes conditional access software, and the broadcaster information includes a conditional access software ID that is a broadcaster ID of the conditional access software.

12. The television receiver of claim 11, wherein the broadcaster information includes an authentication parameter used for the conditional access software.

13. The television receiver of claim 12, wherein the authentication parameter includes a secret key or a public key.

14. The television receiver of claim 1,
wherein a communication unit transmits broadcaster information to an information server connected in such manner as to enable communication, and the content transmitted by the broadcaster for obtaining the package information by using the broadcaster information receives the package information produced by the information server.

15. The television receiver of claim 1, further comprising:
a communication browser for receiving and displaying home page information accumulated in an information server connected in such manner as to enable communication; and
a broadcast browser which receives a data broadcast to display a data broadcast screen;
wherein the control unit uses the broadcast browser to execute control for obtaining and storing the package information in the receiver common information region and uses the communication browser to execute control for transmitting the package information to the information server.

16. The television receiver of claim 1, further comprising:
an input unit for inputting instructions from a user; and
an on screen display (OSD) display means for displaying an operation screen for the user,
wherein the OSD display means displays the broadcast points included in the package information.

17. The television receiver of claim 1, wherein the content transmitted by the broadcaster for obtaining the package information by using broadcaster information stores the broadcaster information in a package information main body and obtains the package information in conformity to a format for addition of a package information header for identifying the package information.

18. The television receiver of claim 17, further comprising a package format memory unit for storing the format,
wherein content transmitted by the broadcaster for obtaining the package information by using the broadcaster information includes information of the format specified and is capable of writing the information in the package format memory unit.

* * * * *